(12) United States Patent
Murphy et al.

(10) Patent No.: US 10,637,177 B2
(45) Date of Patent: Apr. 28, 2020

(54) MODULAR POWER TEE DISTRIBUTION ASSEMBLY

(71) Applicant: Woodhead Industries, LLC, Lisle, IL (US)

(72) Inventors: Joseph F. Murphy, Highland Park, IL (US); Wai Yin Leung, Chicago, IL (US)

(73) Assignee: Woodhead Industries, LLC, Lisle, IL (US)

( * ) Notice: Subject to any disclaimer, the term of this patent is extended or adjusted under 35 U.S.C. 154(b) by 202 days.

(21) Appl. No.: 15/905,261

(22) Filed: Feb. 26, 2018

(65) Prior Publication Data

US 2018/0323532 A1    Nov. 8, 2018

Related U.S. Application Data

(60) Provisional application No. 62/463,821, filed on Feb. 27, 2017.

(51) Int. Cl.
| | | |
|---|---|---|
| *H01R 13/514* | (2006.01) | |
| *H01R 25/00* | (2006.01) | |
| *H01R 9/24* | (2006.01) | |
| *H01R 13/518* | (2006.01) | |
| *H01R 13/512* | (2006.01) | |
| *H01R 24/70* | (2011.01) | |
| *H01R 13/60* | (2006.01) | |
| *H02G 3/00* | (2006.01) | |

(52) U.S. Cl.
CPC ......... *H01R 13/514* (2013.01); *H01R 9/2408* (2013.01); *H01R 13/512* (2013.01); *H01R 13/518* (2013.01); *H01R 25/003* (2013.01); *H01R 13/60* (2013.01); *H01R 24/70* (2013.01); *H01R 25/006* (2013.01); *H02G 3/00* (2013.01)

(58) Field of Classification Search
CPC .. H01R 9/2408; H01R 13/512; H01R 13/514; H01R 13/518; H01R 13/60; H01R 24/70; H01R 25/003; H01R 25/006; H01R 25/145; H01R 31/02; H01R 31/06; H02G 3/00
See application file for complete search history.

(56) References Cited

U.S. PATENT DOCUMENTS

| | | | |
|---|---|---|---|
| 6,422,884 B1* | 7/2002 | Babasick | H01R 13/5812 439/222 |
| 2004/0224562 A1* | 11/2004 | Dolinshek | H01R 31/02 439/638 |
| 2010/0167580 A1* | 7/2010 | Lee | H01R 13/506 439/490 |
| 2011/0308857 A1* | 12/2011 | Zapata | H01R 4/183 174/88 R |
| 2013/0102183 A1* | 4/2013 | Wimmer | H01R 13/6591 439/362 |

* cited by examiner

*Primary Examiner* — Jacob R Crum
(74) *Attorney, Agent, or Firm* — Molex, LLC

(57) ABSTRACT

A modular power tee distribution assembly includes a tee formed of first and second housing pieces which can be mated together. NEMA devices and accessories can be directly attached to the tee. First and second adaptors are provided can be mounted to the tee. The adaptors allow differently sized NEMA devices and accessories to be attached to the tee.

28 Claims, 28 Drawing Sheets

MODULAR POWER TEE DISTRIBUTION ASSEMBLY

RELATED APPLICATIONS

This application claims priority to U.S. Provisional Application Ser. No. 62/463,821, filed on Feb. 27, 2017, the contents of which are incorporated herein in its entirety.

TECHNICAL FIELD

This disclosure relates to the field of power distribution systems.

BACKGROUND OF THE DISCLOSURE

Current power distribution systems utilized in temporary building structures, such as those manufactured and sold by Rubb Building Systems (rubb.com) and Alaska Structures (alaskastructures.com), data-centers, manufacturing plants, and any other facilities/locations where portable devices are used, are either a Daisy-chained topology or a Stringer and Drop topology. The Daisy-chained topology are devices wired in series, and require hard-wired cord sets between each device. The Stringer and Drop topology are devices wired in parallel, and require a working box at each drop junction.

Each of the Daisy-chained topology and the Stringer and Drop topology requires either a skilled electrician and extensive onsite labor or a complex and costly factory-built solution. Each topology further has pre-determined lengths between devices, thereby reducing each topology's flexibility. Furthermore, the finished solution is large in size, heavy to mechanically support, and gives the impression that it is not a dedicated solution intended for the application.

Consequentially, further improvements to the design of power distribution systems would be appreciated by certain individuals.

SUMMARY

In some embodiments, a modular power tee distribution assembly includes a tee formed of first and second housing pieces which can be mated together. NEMA devices and accessories can be directly attached to the tee. First and second adaptors are provided can be mounted to the tee. The adaptors allow differently sized NEMA devices and accessories to be attached to the tee.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

DETAILED DESCRIPTION

Figure 1:
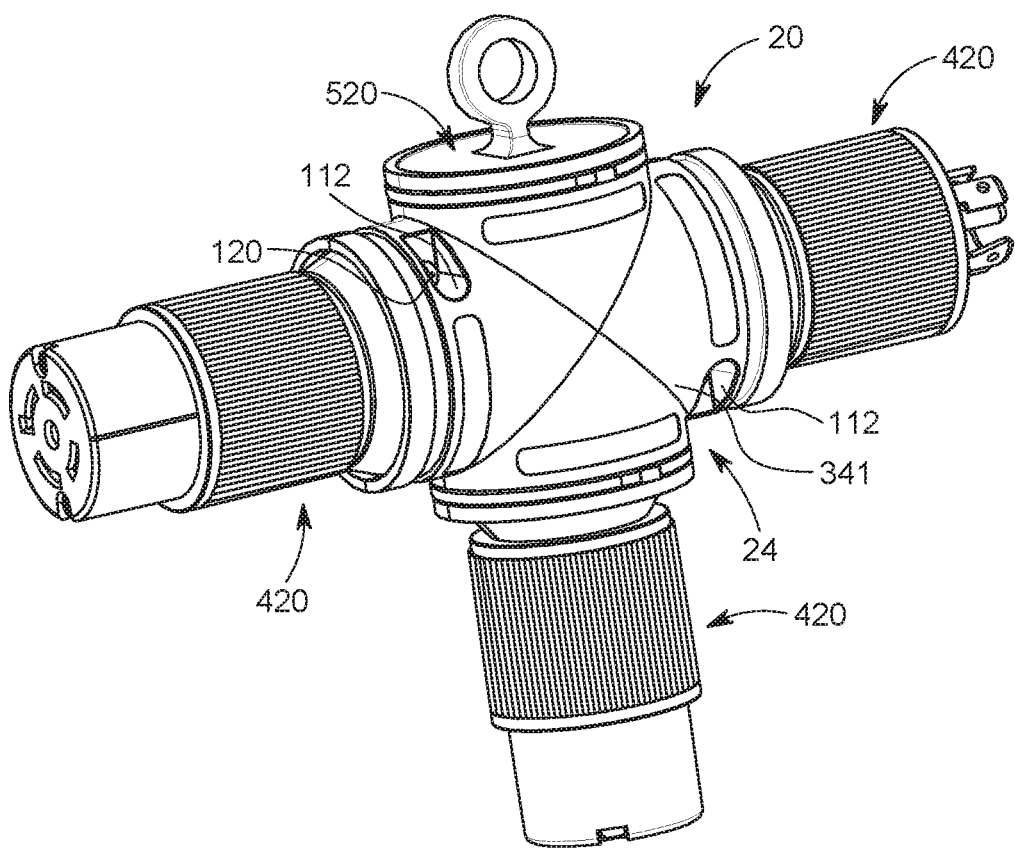
FIG. 1 is a perspective view of a modular power tee distribution assembly having NEMA devices and a hangar accessory attached thereto.
Figure 2:
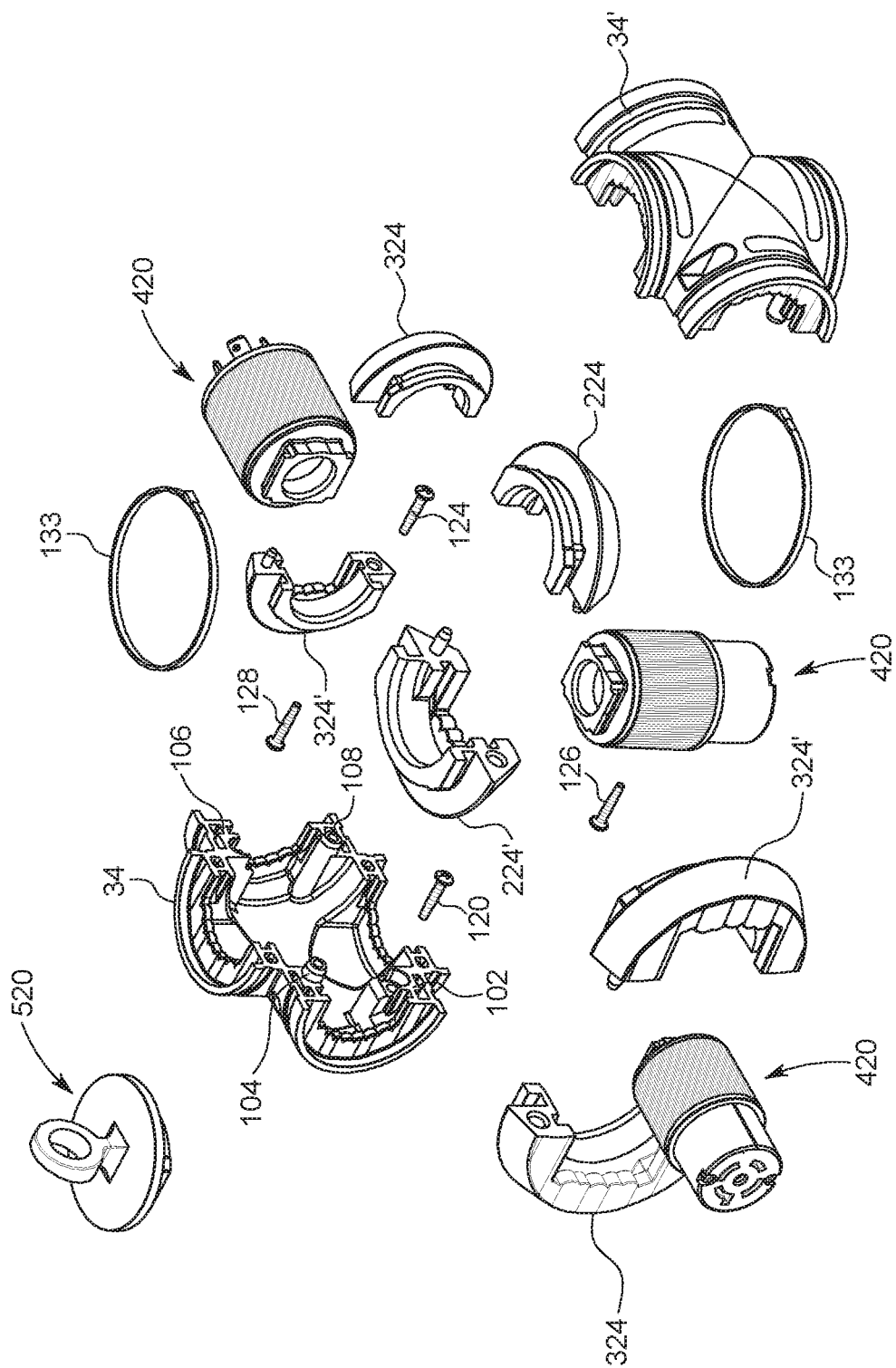
FIG. 2 is an exploded perspective view of the modular power tee distribution assembly, the NEMA devices and the hangar accessory of FIG. 1.
Figure 3:
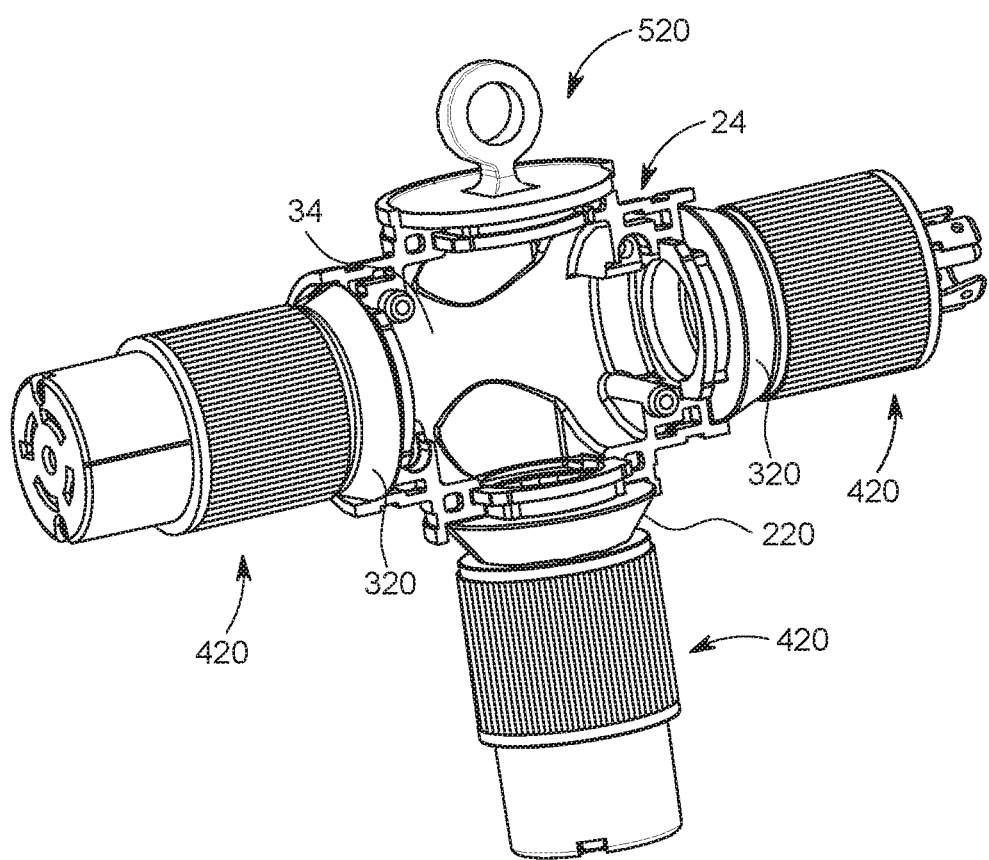
FIG. 3 is a perspective view of the modular power tee distribution assembly, the NEMA devices and the hangar accessory of FIG. 1, with a housing piece removed.
Figure 4:
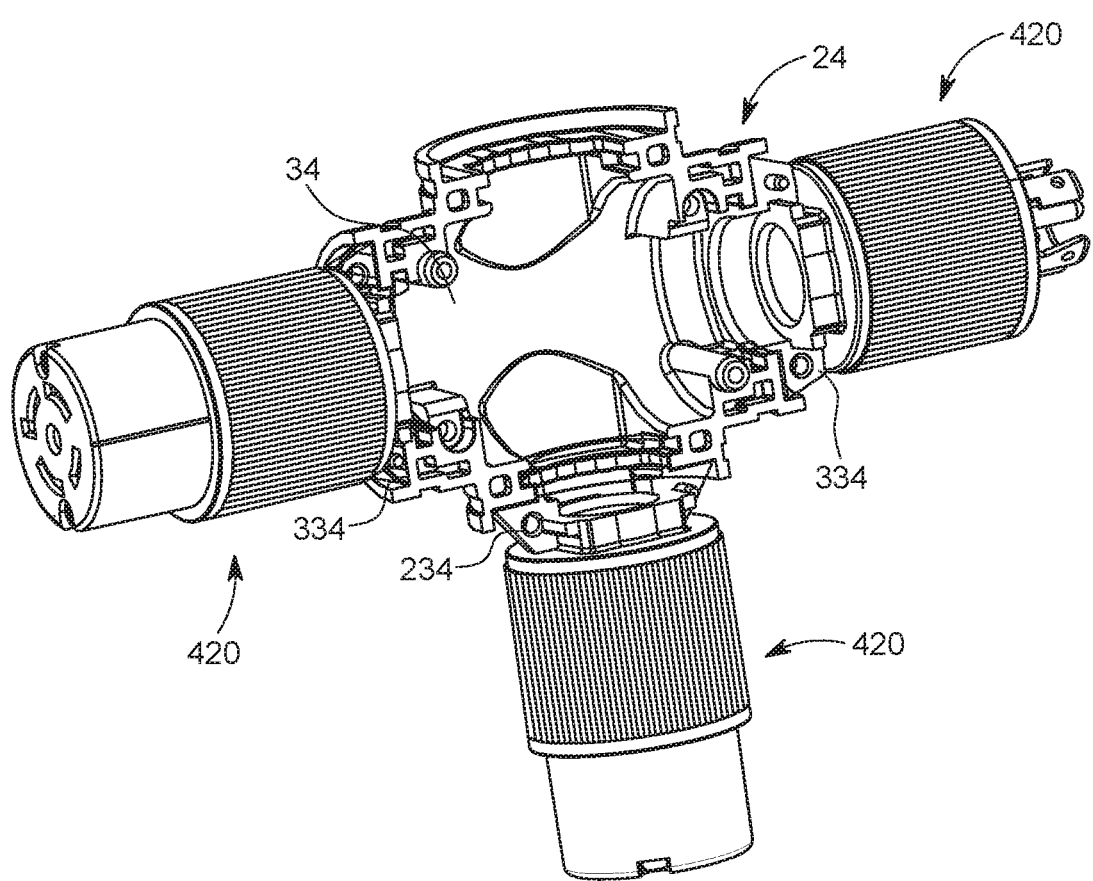
FIG. 4 is a perspective view of the modular power tee distribution assembly and the NEMA devices of FIG. 1, with the housing piece and adaptor pieces removed.
Figure 5:
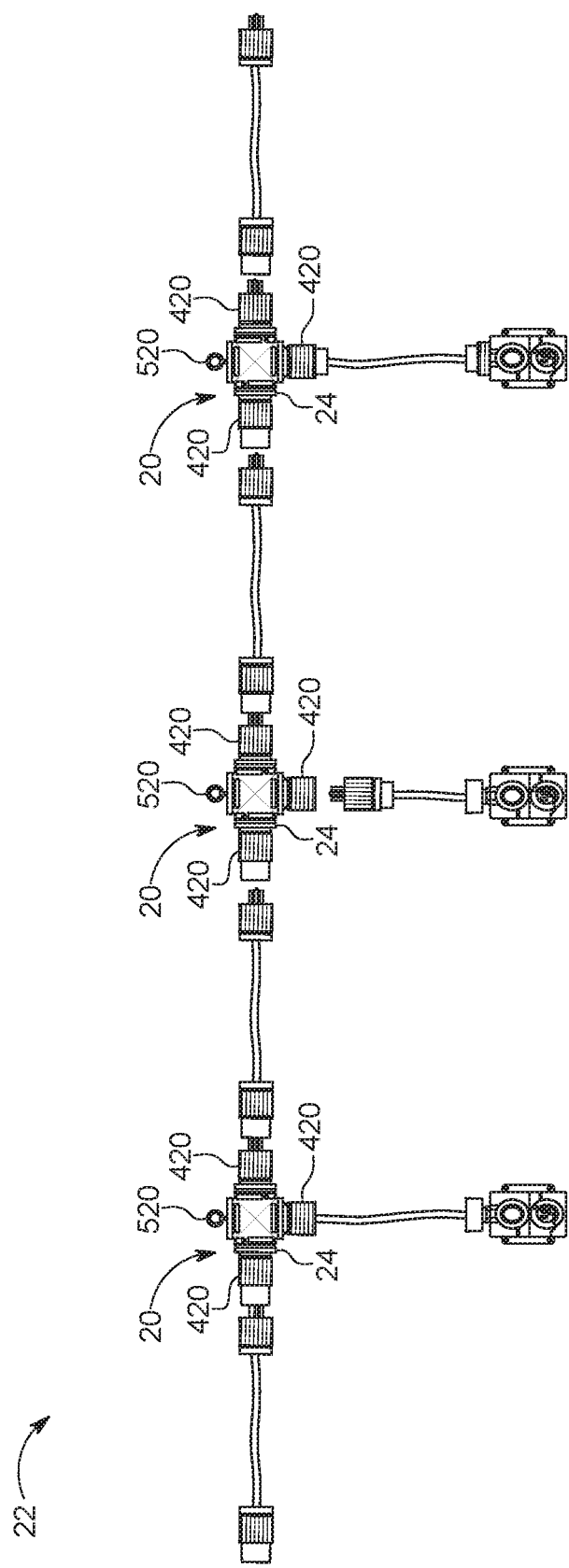
FIG. 5 is a perspective view of a power distribution system which is formed by coupling a plurality of modular power tee distribution assemblies and NEMA devices together.

A modular power tee distribution assembly 20 is provided for use in forming a power distribution system 22. The power distribution system 22 can be utilized in temporary building structures, data-centers, manufacturing plants, and any other facilities/locations where portable devices are used. A representation of the power distribution system 22 is illustrated in FIG. 5. The modular power tee distribution assembly 20 allows for use of a National Electrical Manufacturer Association (NEMA) based wiring method to form the power distribution system 22. The modular power tee distribution assembly 20 is a plug and play system that eliminates the need for a skilled electrician, eliminates wiring errors, and greatly reduces installation time. The modular power tee distribution assembly 20 has building block modularity and, thus, provides adaptability and flexibility to construct a multitude of unique system variations using only a few basic components. As the modular power tee distribution assembly 20 is NEMA-based, universally available NEMA devices make length options easily obtainable. Overall, the modular power tee distribution assembly 20 provides a finished power distribution system 22 that, when compared to current power distribution systems, is compact in size, lighter in weight, and allows for multiple mechanical support options. Furthermore, the design of the modular power tee distribution assembly 20 is streamlined and specifically intended for temporary building structures, data-centers, manufacturing plants, and any other facilities/locations where portable devices are used.

The modular power tee distribution assembly 20 includes a tee 24 and a pair of adaptors 220, 320. Various NEMA devices 420 are attached to the modular power tee distribution assembly 20 and the NEMA devices 420 can be configured to couple two modular power tee distribution assemblies 20 together to form the overall power distribution system 22. Other accessories 520 can also be attached to the modular power tee distribution assembly 20.

For ease in describing the embodiments, directional terms such as "upper", "lower" and the like are used to describe the components of the modular power tee distribution assembly 20, with the understanding that these directional terms do not denote a required orientation in use.

The tee 24 is formed of first and second housing pieces 34, 34', which are identically formed, and are affixed together. The housing pieces 34, 34' may be formed of plastic, such as nylon 66. One of the housing pieces 34 is described with the understanding that the other housing piece 34' is identically formed. Like elements of the housing piece 34' to that of housing piece 34 are shown with a prime after the reference numeral.

Figure 11:
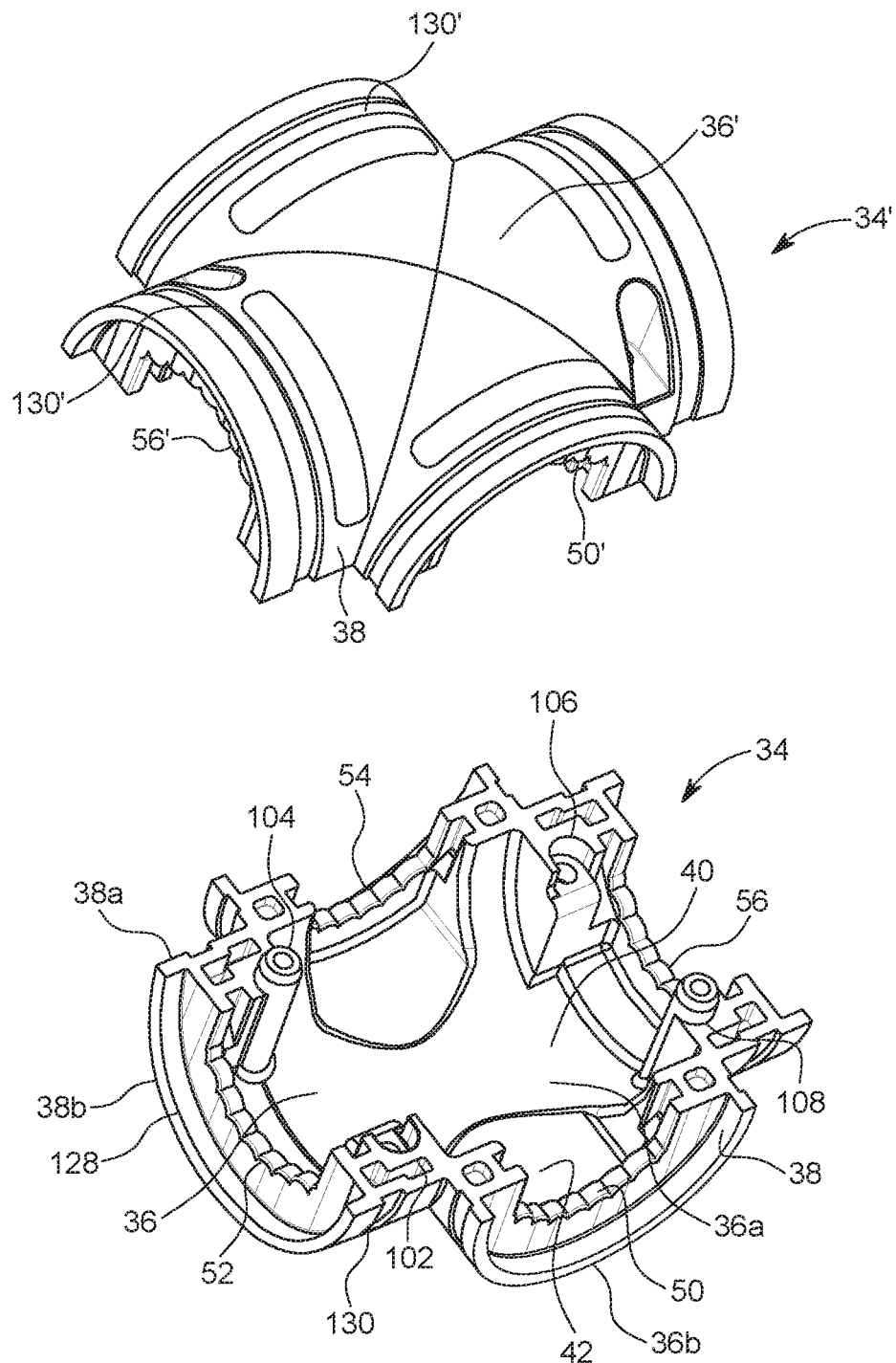
FIG. 11 is an exploded perspective view of the tee.
Figure 12:
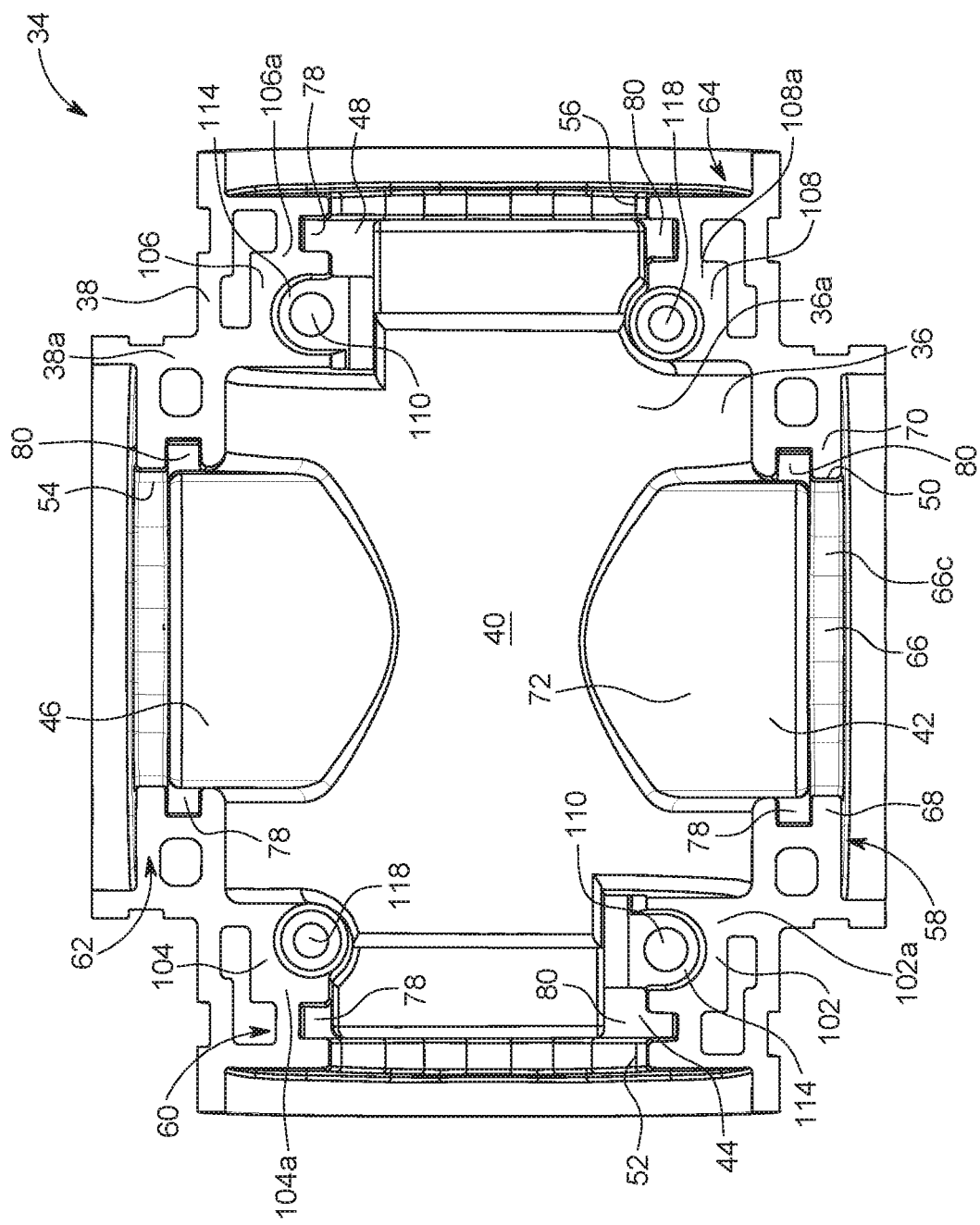
FIG. 12 is a top plan view of one of the housing pieces of the tee.
Figure 13:
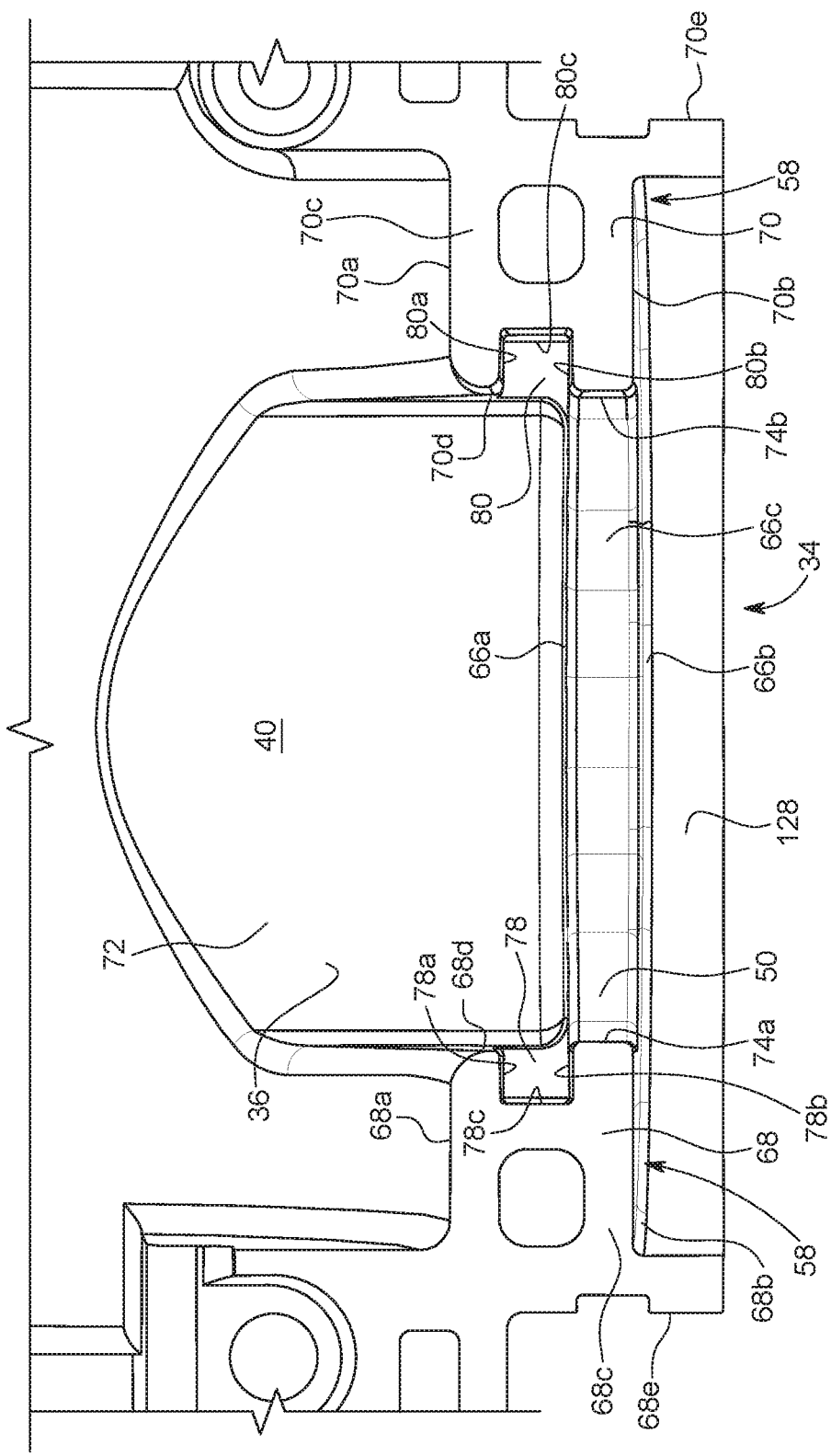
FIG. 13 is a partial top plan view of one of the housing pieces of the tee.
Figure 14:
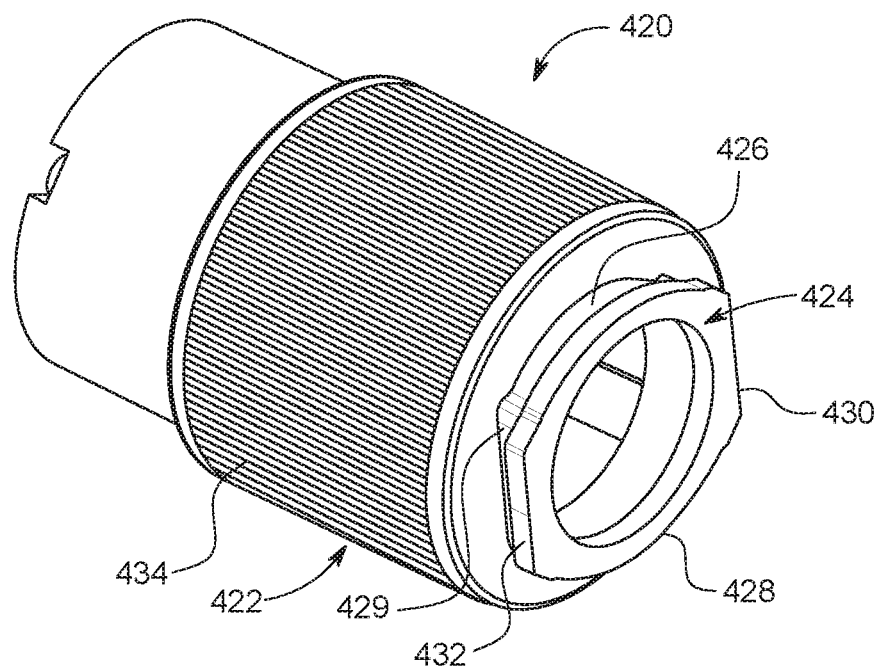
FIG. 14 is a perspective view of an example of a NEMA device which forms part of the modular power tee distribution assembly.
Figure 15:
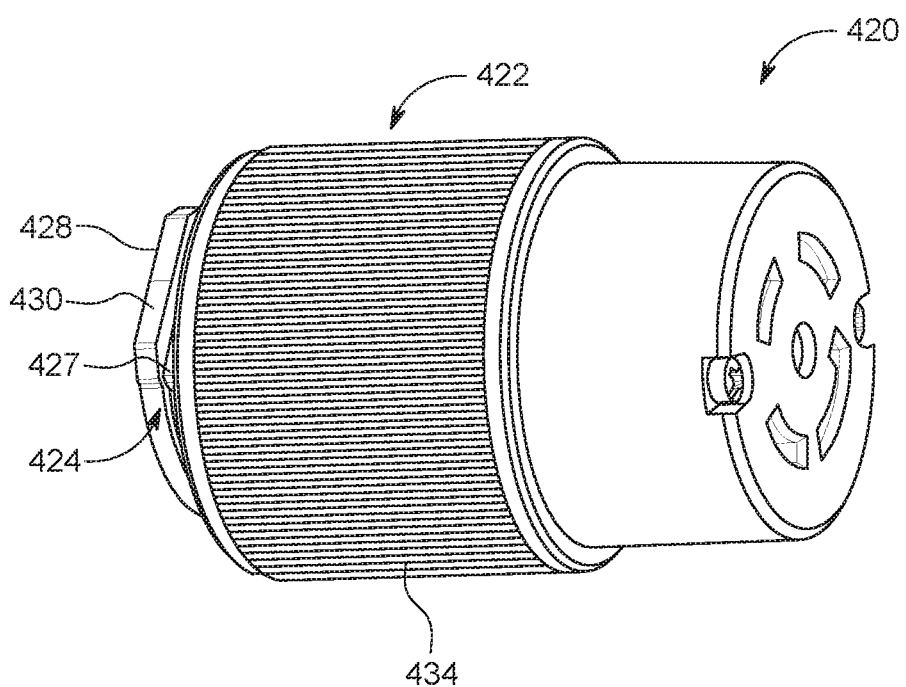
FIG. 15 is an alternate perspective view of the NEMA device of FIG. 14.
Figure 16:
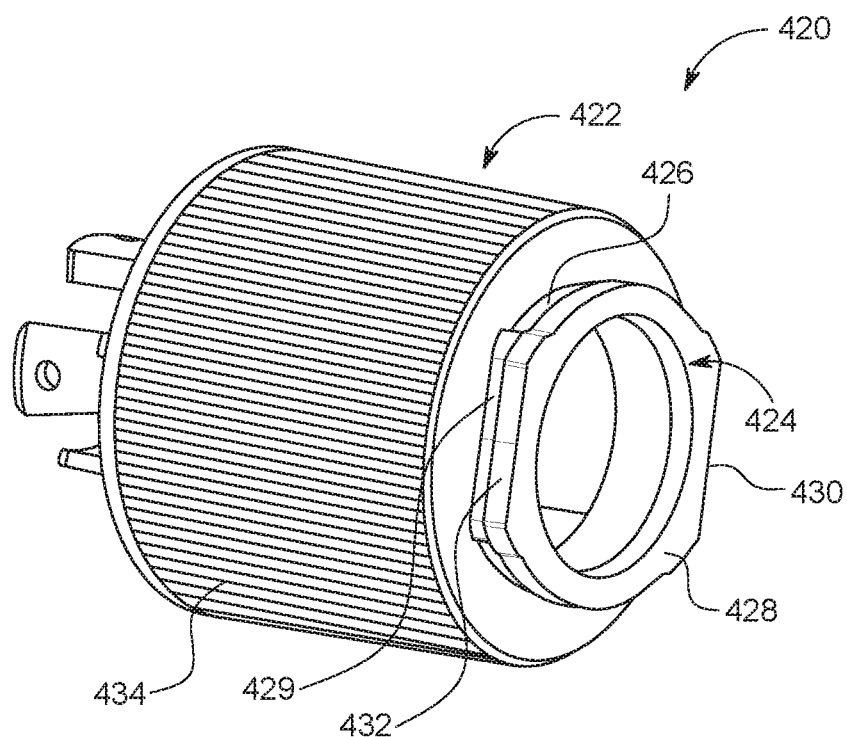
FIG. 16 is a perspective view of another example of a NEMA device which forms part of the modular power tee distribution assembly.
Figure 17:
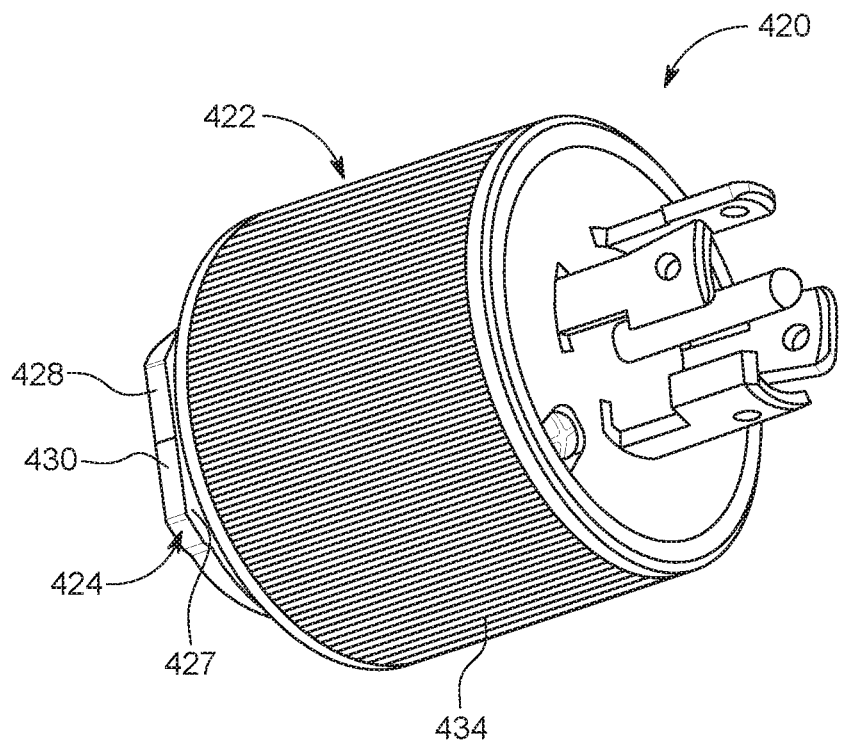
FIG. 17 is an alternate perspective view of the NEMA device of FIG. 16.

As best shown in FIGS. 11-13, the housing piece 34 has a base wall 36 having an upper surface 36a and a lower surface 36b, and a side wall 38 having a lower end 38b at the base wall 36 and extending upwardly from the upper surface 36a thereof to an upper surface 38a. The upper surface 38a of the side wall 38 is planar. The base wall 36 and the side wall 38 form a central pocket 40 and tongue receiving recesses 42, 44, 46, 48 which lead into, and are in communication with, the pocket 40. A plurality of spaced apart side wall openings 50, 52, 54, 56 are provided through the side wall 38. The side wall openings 50, 52, 54, 56 form part of the respective tongue receiving recesses 42, 44, 46, 48. While four tongue receiving recesses 42, 44, 46, 48 are shown in the drawings, two tongue receiving recesses may only be provided, three tongue receiving recesses may only be provided, and more than four tongue receiving recesses may be provided. In an embodiment as shown in the drawings, the base wall 36 generally forms a cross shape, such that the side wall 38 is formed of a plurality of wall portions which are perpendicular to each other, with side wall openings 50, 54 aligned with each other and side wall openings 52, 56 aligned with each other and perpendicular to the side wall openings 50, 54.

Each tongue receiving recess 42, 44, 46, 48 is formed from a set of wall portions 58, 60, 62, 64. Each set 58, 60, 62, 64 is formed of first, second and third side wall portions 66, 68, 70 of the side wall 38. Each set 58, 60, 62, 64 is identically formed, and therefore, one set 58 is described.

The second and third side wall portions 68, 70 extend at an angle from opposite ends of the first side wall portion 66. In an embodiment, the second and third side wall portions 68, 70 are parallel to each other. The second and third side wall portions 68, 70 may be angled relative to each other. Each side wall portion 66, 68, 70 extends upwardly from the upper surface 36a of the base wall 36. As best shown in FIG. 13, the first side wall portion 66 has an inner surface 66a, an outer surface 66b, and an upper surface 66c extending between the inner and outer surfaces 66a, 66b. A thickness of the first side wall portion 66 is defined between its inner surface 66a and its outer surface 66b. The second side wall portion 68 has an inner surface 68a, an outer surface 68b, an upper planar surface 68c extending between the inner and outer surfaces 68a, 68b, a planar side surface 68d extending between the inner and outer surfaces 68a, 68b, and a side surface 68e extending between the inner and outer surfaces 68a, 68b. A thickness of the second side wall portion 68 is defined between its inner surface 68a and its outer surface 68b. The third side wall portion 70 has an inner surface 70a, an outer surface 70b, an upper planar surface 70c extending between the inner and outer surfaces 70a, 70b, a planar side surface 70d extending between the inner and outer surfaces 70a, 70b, and a side surface 70e extending between the inner and outer surfaces 68a, 68b. A thickness of the third side wall portion 70 is defined between its inner surface 70a and its outer surface 70b. The side surfaces 68d, 70d face each other. The upper surfaces 68c, 70c may be coplanar. The upper surface 66c of the first wall portion 66 is spaced downwardly from the upper surfaces 68c, 70c of the side wall portions 68, 70. The thickness of the first wall portion 66 is less than the thickness of the second and third wall portions 68, 70 such that a space 72 is formed inwardly of the first wall portion 66 and between the second and third wall portions 68, 70. Each side wall portion 66, 68, 70 may be perpendicular to the base wall 36.

The side wall opening 50 of the tongue receiving recess 42 is formed by the upper surface 66c of the first wall portion 66 and an outer portion of the inner surfaces 68d, 70d of the second and third side walls 68, 70. As such, the side wall opening 50 is formed by the upper surface 66c of the first wall portion 66, a first planar vertical surface 74a formed by the outer portion of the inner surface 68d and extends from the upper surface 68c to a lower end which is spaced from the base wall 36, and a second planar vertical surface 74b formed by the outer portion of the inner surface 70d and extends from the upper surface 70c to a lower end which is spaced from the base wall 36. The upper surface 66c of the first wall portion 66 may be curved. A width of the side wall opening 50 is defined between the vertical surfaces 74a, 74b.

The tongue receiving recess 42 is further formed from at least a first vertical groove 78 which is recessed from the inner surface 68d of the second side wall portion 68 and extends downwardly from the upper surface 68c, a second vertical groove 80 which is recessed from the inner surface 70d of the third side wall portion 70 and extends downwardly from the upper surface 70c, and the space 72 between the second and third side wall portions 68, 70. Each groove 78, 80 is in communication with the space 72. Each groove 78, 80 has an inner vertical surface 78a, 80a, an outer vertical surface 78b, 80b and a side vertical surface 78c, 80c extending between the inner surface 78a, 80a and the outer surface 78b, 80b. The side surface 78c, 80c is recessed from the side surface 68d, 70d of the side wall portion 68, 70. The inner surfaces 78a, 80a are coplanar; the outer surfaces 78b, 80*b* are coplanar; and the side surface 78*c*, 80*c* face each other and are parallel to each other. Each groove 78, 80 extends downwardly a predetermined distance from the upper surface 68*c*, 70*c* toward the base wall 36, and may extend the entire height of the side wall portion 68, 70 to the base wall 36. A width of the tongue receiving recess 42 is defined between the side surfaces 78*c*, 80*c* of the grooves 78, 80, and a thickness of the tongue receiving recess 42 is defined between the inner and outer surfaces 78*a*, 78*b*, 80*a*, 80*b* of the grooves 78, 80. The tongue receiving recess 42 may further be formed from a third wall portion (not shown) which extends upwardly from the base wall 36 and forms a horizontal groove (not shown) which is in communication with the grooves 78, 80 and is below and in communication with the space 72.

For convenience in explanation only to describe the mating of the housing pieces 34, 34' and as shown in the drawings, each housing piece 34, 34' is assumed to have four side wall openings 50, 52, 54, 56 and 50', 52', 54', 56'. It is to be understood that only two openings may be provided, three openings may be provided, or more than four openings may be provided. The housing pieces 34, 34' are mated together and then affixed to each other to form the tee 24. When mated, the surfaces 38*a*, 38*a*' of the side walls 38, 38' mate with each other.

The surfaces 68*c*, 70*c* in the set 58 mate with the surfaces 68*c*', 70*c*' of the set 58'. The side wall openings 50 in the set 58 aligns with the side wall opening 50' in the set 58' and form an entrance opening 82. The groove 78 in the set 58 aligns with groove 80' in the set 58', the groove 80 in the set 58 aligns with groove 78' in the set 58', and the space 72 in the set 58 aligns with the space 72' in the set 58' to form a tongue receiving passageway 84. This forms mated set 58/58'.

The surfaces 68*c*, 70*c* in the set 60 mate with the surfaces 68*c*', 70*c*' of the set 64'. The side wall opening 52 of the set 60 aligns with the side wall opening 56' of the set 64' and form an entrance opening 86. The groove 78 in the set 60 aligns with groove 78' in the set 64', the groove 80 in the set 60 aligns with groove 80' in the set 64', and the space 72 in the set 60 aligns with the space 72' in the set 64' to form a tongue receiving passageway 88. This forms mated set 60/64'.

The surfaces 68*c*, 70*c* in the set 62 mate with the surfaces 68*c*', 70*c*' of the set 62'. The side wall opening 54 of the set 62 aligns with the side wall opening 54' of the set 62' and form an entrance opening 90. The groove 78 in the set 62 aligns with groove 80' in the set 62', the groove 80 in the set 62 aligns with groove 78' in the set 62', and the space 72 in the set 62 aligns with the space 72' in the set 62' to form a tongue receiving passageway 92. This forms mated set 62/62'.

The surfaces 68*c*, 70*c* in the set 64 mate with the surfaces 68*c*', 70*c*' of the set 60'. The side wall opening 56 in the set 64 aligns with the side wall opening 52' in the set 60' and form an entrance opening 94. The groove 78 in the set 64 aligns with groove 78' in the set 60', the groove 80 in the set 64 aligns with groove 80' in the set 60', and the space 72 in the set 64 aligns with the space 72' in the set 60' to form a tongue receiving passageway 98. This forms mated set 64/60'.

The central pockets 40, 40' align with each other to form a central cavity 100.

The housing pieces 34, 34' can be affixed together by a variety of locks. In an embodiment and as shown in the drawings, the lock takes the form of a plurality of spaced apart fastener bosses 102, 104, 106, 108 which extend upwardly from the base wall 36 into the pocket 40. In an embodiment, the bosses 102, 104, 106, 108 also extend from the side wall 38 and into the pocket 40. Each boss 102, 104, 106, 108 terminates in an upper surface 102*a*, 104*a*, 106*a*, 108*a*. In an embodiment, four fastener bosses 102, 104, 106, 108 are provided. Fastener bosses 102, 106 have a passageway 110 which extends through the base wall 36 and through the boss 102, 106. A countersink 112 may be formed in the lower surface 36*b* of the base wall 36 around each passageway 110. A countersink 114 may be formed in the boss 102, 106 in its upper surface 102*a*, 106*a* around the passageway 110. Fastener bosses 104, 108 have a projection 116 which extends outwardly from the upper surfaces 104*a*, 108*a*. A blind bore 118 is provided in each projection 116. In an embodiment, fastener bosses 102, 106 are diagonal to each, and fastener bosses 104, 108 are diagonal to each other. When the housing pieces 34, 34' are mated together, the projection 116 on boss 104 of housing piece 34 seats within the countersink 114' of boss 106' of housing piece 34' and a fastener 120 is seated through the passageway 110' of boss 106' and into the blind bore 118 of projection 116 of boss 104; the projection 116 on boss 108 of housing piece 34 seats within the countersink 114' of boss 102' of housing piece 34' and a fastener 122 is seated through the passageway 110' of boss 102' and into the blind bore 118 of projection 116 of boss 108; the projection 116' on boss 104' of housing piece 34' seats within the countersink 114 of boss 106 of housing piece 34 and a fastener 124 is seated through the passageway 110 of boss 106 and into the blind bore 118' of projection 116' of boss 104'; and the projection 116' on boss 108' of housing piece 34' seats within the countersink 114 of boss 102 of housing piece 34 and a fastener 126 is seated through the passageway 110' of boss 108' and into the blind bore 118 of projection 116 of boss 102. The fasteners 120, 122, 124, 126 secure the housing pieces 34, 34' together. The fasteners 120, 122, 124, 126 may be self-tapping. Other locks for affixing the housing pieces 34, 34' together can be provided. Further examples of such locks are external or internal releasable locks, such as, but not limited to, latches, snap-fit connections, or permanent locks, such as, but not limited to, staked posts, glue, heat staking.

In an embodiment, at each side wall opening 50, 52, 54, 56, the base wall 36 and the wall portions 68, 70 extend outwardly from each first wall portion 66 to form a skirt 128. When the housing pieces 34, 34' are mated together, the mated skirts 128, 128' form part of the entrance openings 82, 86, 90, 94. In an embodiment, the portion of each entrance opening 82, 86, 90, 94 formed by the mated skirts 128, 128' is circular.

In an embodiment, a groove 130 is provided in the lower surface 36*b* of the base wall 36 and in the side surface 68*e*, 70*e* of the side walls 68, 70 such that when the housing pieces 34, 34' are mated together, a continuous groove 132 is formed around each mated set 58/58', 60/64', 62/62', 64/60'. Each groove 132 may be identically sized and shaped.

Each mated set 58/58', 60/64', 62/62', 64/60' is configured to receive a NEMA device 420, one of the adaptors 220, 320 which in turn is configured to receive a NEMA device 420, or an accessory 520. In addition, rigid conduit (not shown) can be passed through the entrance opening 82, 86, 90, 94 and the tongue receiving passageway 84, 88, 92, 98 of any mated set 58/58', 60/64', 62/62', 64/60' and into the central cavity 100.

Each NEMA device 420 or accessory 520 has a body 422 which can be gripped by a user, and a tongue 424 extending from the body 422 and which seats within the entrance opening 82, 86, 90, 94 and the entrance opening 82, 86, 90, 94 of one of the mated sets 58/58', 60/64', 62/62', 64/60'.

The tongue 424 has a first wall section 426 which extends from the body 422 and which mirrors the shape of the entrance opening 82, 86, 90, 94. The first wall section 426 engages with the surfaces described herein which form one of the entrance openings 82, 86, 90, 94. The tongue 424 further has a second wall section 428 which extends outwardly from the first wall section 426 and which mirrors at least the shape of the aligned grooves 78, 78', 80, 80' of the tongue receiving passageway 84, 88, 92, 98. The second wall section 428 engages with the surfaces described herein which form the associated tongue receiving passageway 84, 88, 92, 98. When the NEMA device 420 or accessory 520 is seated within one of the tongue receiving passageways 84, 88, 92, 98, a tight friction fit is achieved. In an embodiment, the first wall section 426 has flat surfaces 427, 429 which seat against the aligned planar vertical surfaces 74a', 74b' of mated set 58/58', or of mated set 60/64', or of mated set 62/62', or of mated set 64/60'. In an embodiment, the tongue 424 has flat surfaces 430, 432 which seat within the aligned grooves as described herein of mated set 58/58', or of mated set 60/64', or of mated set 62/62', or of mated set 64/60'. This engagement of the flat surfaces 427, 429, 430, 432 with the side surfaces 78c, 78c', 80c, 80c' of the grooves 78, 78', 80, 80' prevents the rotation of the NEMA device 420 or accessory 520 relative to the tee 24.

In an embodiment, the surface 66c, 66c' of the first wall portion 66, 66' of each housing piece 34, 34' may be curved and may have a plurality of teeth 76, 76' thereon. In this embodiment, an outer point of each tooth 76, 76' forms the entrance opening 82, 86, 90, 94. When the wall section 426 engages with the teeth 76, the teeth 76 form individual points of contact with the wall section 426 to better engage the wall section 426.

In an embodiment, the inner and outer surfaces 66a, 66b of the first side wall portion 66 may angle outwardly from each other to further enhance the frictional fit of the second wall section 428 with the tongue receiving passageway 84, 88, 92, 98. In some embodiments, crush ribs (not shown) may be provided on the inner and outer surfaces 66a, 66b of the first side wall portion 66 which are crushed when the NEMA device 420 or accessory 520 is engaged with the tee 24.

The body 422 in the NEMA devices 420 may be formed as a part of a housing 434 in which electrical components are provided. NEMA devices are categorized as: (1) 15 Amp (locking and straight blade) and 20 Amp (straight blade) NEMA devices (herein "Size A"); (2) 20 Amp (locking blade) NEMA devices (herein "Size B"); and (3) 30 Amp (locking and straight blade) NEMA devices (herein "Size C").

The tongue 424 of the Size B NEMA device (herein the "Size B tongue") is smaller than the tongue 424 of the Size C NEMA device (herein the "Size C tongue"). The tongue 424 of the Size A NEMA device (herein the "Size A tongue") is smaller than the Size B tongue. Therefore, the Size C tongue is the largest. The Size C tongue is shaped to seat directly within the tongue receiving passageways 84, 88, 92, 98 of the tee 24 and achieve a friction fit. The accessory 520 may also have one of a Size A tongue, a Size B tongue, and a Size C tongue. The Size A tongue and the Size B tongue will not seat within tongue receiving passageway 84, 88, 92, 98 of the tee 24. The Size A tongue is configured to be received within the adaptor 220, but not within adaptor 320 or directly within the tee 24. The Size B tongue is configured to be received within the adaptor 320, but not within adaptor 220 or directly within the tee 24. Therefore, sizes of the Size A tongue, the Size B tongue, and the Size C tongue are different from each other.

When the Size C tongue is seated within the tee 24, the first wall section 426 engages with the surfaces which form one of the entrance openings 82, 86, 90, 94, and the second wall section 428 engages with the surfaces which form the associated tongue receiving passageway 84, 88, 92, 98. The housing 434 extends outwardly from the first wall portion 66. A tight friction fit is achieved between the Size C tongue and the tee 24. If the skirts 128, 128' are provided, the skirts 128, 128' overlap the housing 434 and hide the connection point between the Size C NEMA device and the tee 24. To assemble a Size C NEMA device with the tee 24, the housing pieces 34, 34' are initially separated. The Size C NEMA device is then inserted into one of the housing pieces 34 such that the first wall section 426 engages with the surfaces which form one of the entrance openings 82, 86, 90, 94, and the second wall section 428 engages with the surfaces which form the associated tongue receiving passageway 84, 88, 92, 98. Any additional Size C NEMA devices 420 or accessories 520 which have a Size C tongue which are desired to be attached to the tee 24 are also inserted at this time. Thereafter, the second housing piece 34' is mated with the first housing piece 34 and engages the Size C NEMA device in the same manner, and is affixed to the first housing piece 34. This clamps the Size C NEMA device 420 (and/or accessory 520) between the housing pieces 34, 34'.

Figure 6:
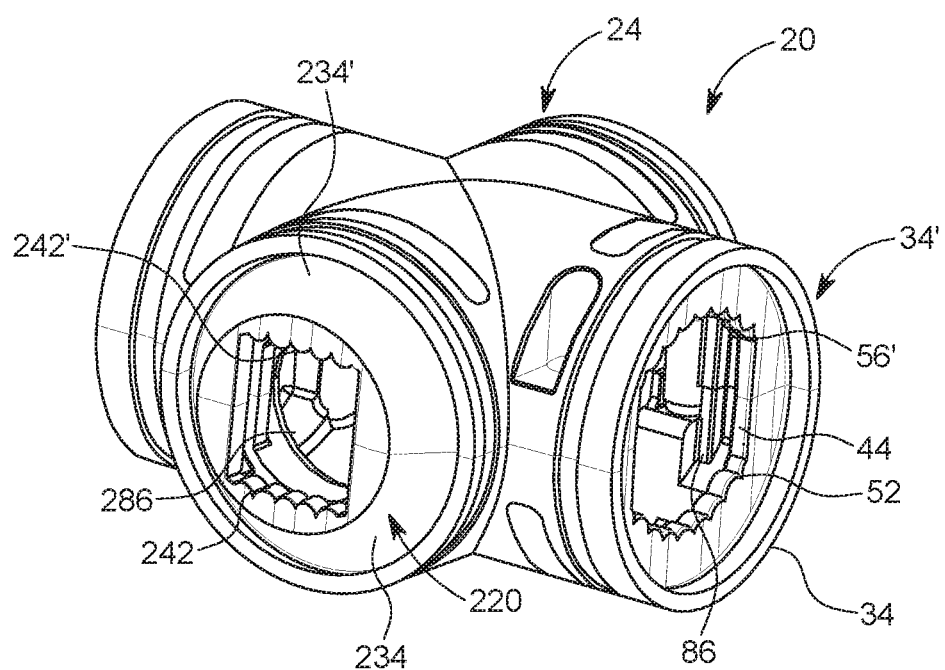
FIG. 6 is a perspective view of the modular power tee distribution assembly with one adaptor attached to the tee.
Figure 7:
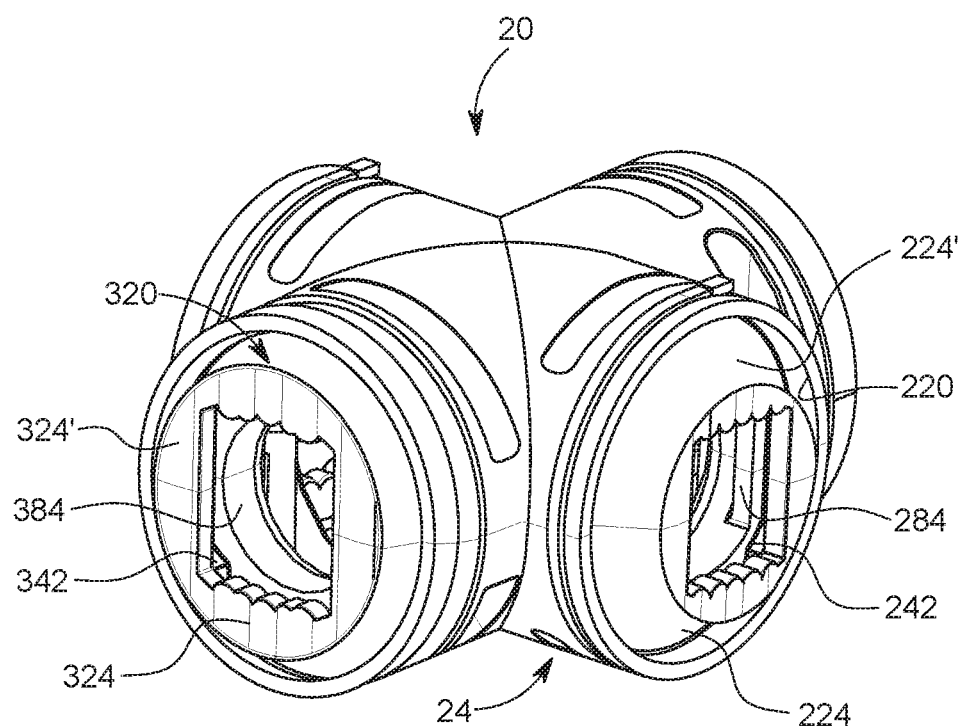
FIG. 7 is a perspective view of the modular power tee distribution assembly with two adaptors attached to the tee.
Figure 8:
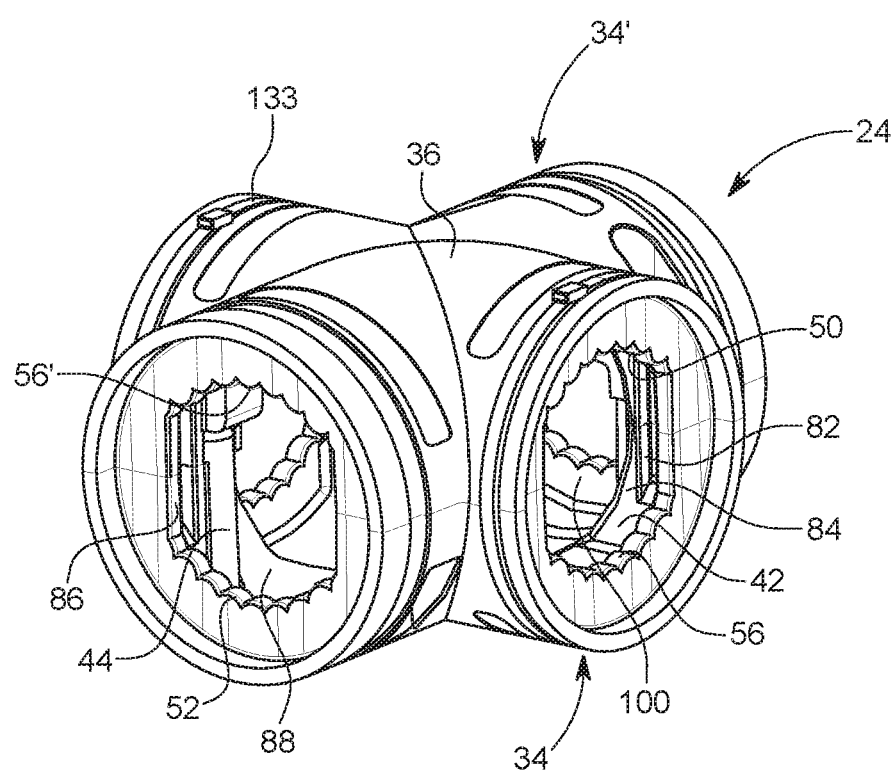
FIG. 8 is a perspective view of the tee of the modular power tee distribution assembly.
Figure 9:
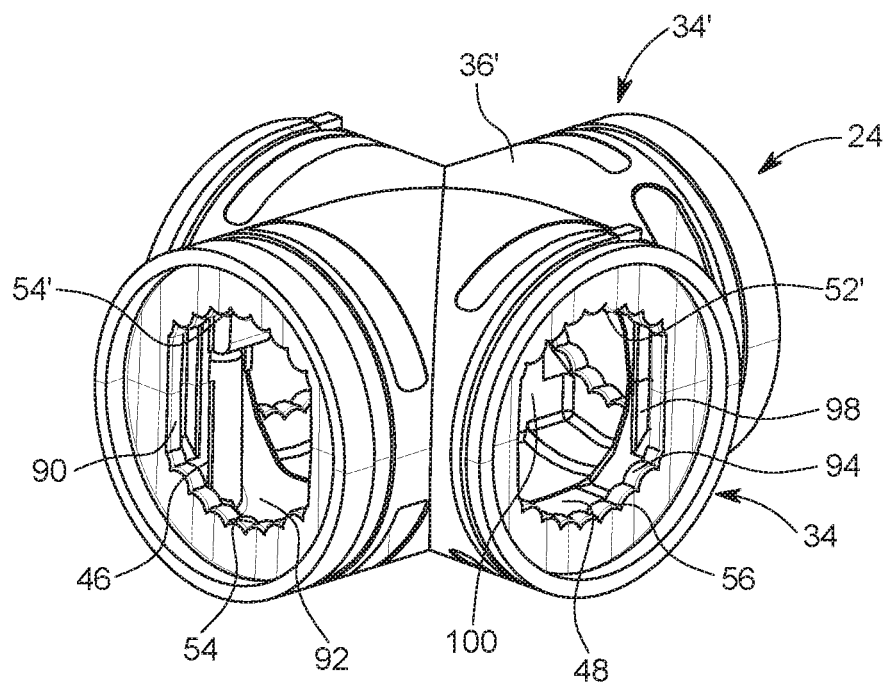
FIG. 9 is an alternate perspective view of the tee.
Figure 10:
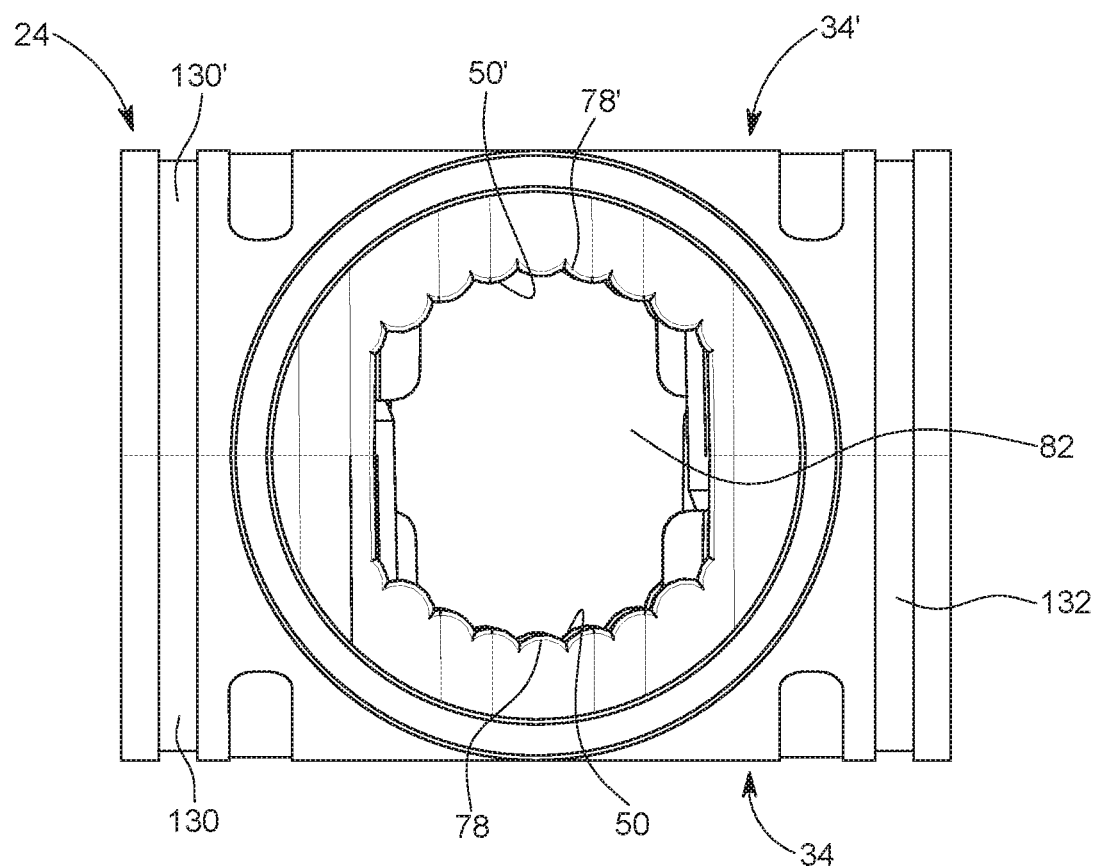
FIG. 10 is an elevation view of the tee.

As illustrated in FIGS. 6 and 7, the modular power distribution assembly 20 further provides for the first and second adaptors 220, 320. The first adaptor 220 provides for a Size C to Size A configuration. The second adaptor 320 provides for a Size C to Size B configuration. Thus, with the provision of the two different adaptors 220, 320, each entrance opening 82, 86, 90, 94 and associated tongue receiving passageway 84, 88, 92, 98 of the tee 24 which is designed to only accept a Size C tongue can be converted to accept either a Size A tongue or a Size B tongue, as desired, thereby allowing for any desired NEMA device 420 or accessory 520 to be seated within any one of the tongue receiving passageways 84, 88, 92, 98 of the tee 24 by way of the adaptor 220, 320. The Size A adaptor 220 is first described and thereafter, the Size B adaptor 320 is described.

As shown in FIGS. 28-33, the Size A adaptor 220 has a body 222 which can be gripped by a user, and a tongue 224 extending from the body 222 and which seats within the entrance opening 82, 86, 90, 94 and associated tongue receiving passageway 84, 88, 92, 98 of one of the mated sets 58/58', 60/64', 62/62', 64/60'. The Size A adaptor 220 is formed of two identical adaptor pieces 234, 234' which are mounted to each other in order to form the complete Size A adaptor 220, which Size A adaptor 220 is preferably formed in the shape of a ring. The housing pieces 234, 234' may be formed of plastic, such as nylon 66. Since each adaptor piece 234, 234' of the Size A adaptor 220 is identical, only one of the adaptor pieces 234 is described. Like elements of the adaptor piece 234' are shown with a prime after the reference numeral.

The body 222 has a base wall 266, a first side wall 268 extending upwardly from the base wall 266, and a second side wall 270 extending upwardly from the base wall 266. The base wall 266 and the side walls 238, 270 form a tongue receiving recess 242.

The base wall 266 has a rear surface 266a, a front surface 266b, an upper surface 266c extending between the rear and front surfaces 266a, 266b, and a lower surface 266d extending between the rear and front surfaces 266a, 266b. The first side wall 268 has a rear surface 268a, a front surface 268b, an upper surface 268c extending between the rear and front surfaces 268a, 268b, a planar side surface 268d extending between the rear and front surfaces 268a, 268b, and a side surface 268e extending between the rear and front surfaces 268a, 268b. The second side wall 270 has a rear surface 270a, a front surface 270b, an upper surface 270c extending between the rear and front surfaces 270a, 270b, a planar side surface 270d extending between the rear and front surfaces 270a, 270b, and a side surface 270e extending between the rear and front surfaces 270a, 270b. The side surfaces 268d, 270d face each other. The upper surface 266c of the base wall 266 is spaced downwardly from the upper surfaces 268c, 270c of the side walls 268, 270.

The tongue receiving recess 242 is formed by the upper surface 266c of the base wall 266 and the planar inner surfaces 268d, 270d of the side walls 268, 270. The upper surface 266c of the base wall 266 may be generally linear. A height of the tongue receiving recess 242 is defined between the upper surface 266a and the upper surface 268c or 270c.

The tongue receiving recess 242 further includes a tongue receiving groove 265 formed in the walls 266, 268, 270 which is formed from a first vertical groove portion 278 which is recessed from the inner surface 268d of the side wall 268 and extends downwardly from the upper surface 268c thereof, a second vertical groove portion 280 which is recessed from the inner surface 270d of the side wall 270 and extends downwardly from the upper surface 270c thereof, and a third horizontal groove portion 281 which is recessed from the upper surface 266a of the base wall 266 and extends downwardly from the upper surface 266a. Each groove portion 278, 280 has a rear vertical surface 278a, 280a, a front vertical surface 278b, 280b and a side vertical surface 278c, 280c extending between the rear surface 278a, 280a and the front surface 278b, 280b. The side surface 278c, 280c is recessed from the side surface 268d, 270d of the wall 268, 270. The groove portion 281 has a rear vertical surface 281a, a front vertical surface 281b, and a lower vertical surface 281c extending between the rear surface 281a and the front surface 281b. The rear surfaces 278a, 280a, 281a are coplanar; the front surfaces 278b, 280b, 281b are coplanar; and the side surfaces 278c, 280c face each other. A width of the tongue receiving recess 242 is defined between the side surfaces 278c, 280c of the grooves 278, 280, and a thickness of the tongue receiving recess 242 is defined between the rear and front surfaces 278a, 278b, 280a, 280b, 281a, 281b of the grooves 278, 280, 281. In an embodiment, the tongue receiving groove 265 generally forms a U-shape.

The tongue 224 has a first wall section 226 which extends from the body 222 and has an outer profile which mirrors the shape of half of the entrance opening 82, 86, 90, 94. An inner profile of the tongue 224 forms a recess 225 which aligns with the tongue receiving recess 242 in the body 222. The outer profile of the first wall section 226 engages with the surfaces which form one of the entrance openings 82, 86, 90, 94. The tongue 224 further has a second wall section 228 which extends outwardly from the first wall section 226 and which mirrors at least the shape of half of the aligned grooves 78, 78', 80, 80' of the tongue receiving passageway 84, 88, 92, 98. The second wall section 228 engages with the surfaces which form the associated tongue receiving passageway 84, 88, 92, 98.

The two adaptor pieces 234, 234' are mated together to form the adaptor 220. When mated, the surface 268c of adaptor piece 234 engages with surface 270c' of adaptor piece 234', the surface 268c' of adaptor piece 234' engages with surface 270c of adaptor piece 234, and the tongue receiving recesses 242, 242' form a tongue receiving passageway 284. A central passageway 286 is formed through the adaptor 220 by the mated tongue receiving recesses 242, 242'. In an embodiment, the adaptor piece 234 includes a projection 216 extending from the upper surface 270c of wall 270 and a blind bore 218 extending from the upper surface 270c into wall 270. When mated, the projection 216 on adaptor piece 234 seats within the blind bore 218' of adaptor piece 234', and the projection 216' on adaptor piece 234' seats within the blind bore 218 of adaptor piece 234. The projections 216, 216' can be secured to the blind bores 218', 218 by a friction fit.

It is to be understood that the adaptor 220 can be divided in half such that the groove portions 281 are bifurcated.

To seat the Size A NEMA device within the Size A adaptor 220, the adaptor pieces 234, 234' are separated from each other. When the Size A tongue is seated within the adaptor piece 234, the first wall section 426 of the Size A tongue engages with the upper surface 266a of the base wall 266 which is forward of the tongue receiving groove 265 of the Size A adaptor 220, and the second wall section 426 of the Size A tongue engages with the surfaces which form the tongue receiving groove 265 of the Size A adaptor 220. The body 422 extends outwardly from the front surfaces 266b, 268b, 270b of the Size A adaptor 220. A tight friction fit is achieved between the Size C tongue and the adaptor piece 234. Thereafter, the second adaptor piece 234' is mated with the first adaptor piece 234 and engages the Size A NEMA device in the same manner. This clamps the Size A NEMA device (and/or accessory 520 which has a Size A tongue) between the adaptor pieces 234, 234'.

Thereafter, the Size A adaptor 220 and its attached Size A NEMA device (or accessory 520 which has a Size A tongue) are attached to the tee 24. To assemble the Size A adaptor 220 and its attached Size A NEMA device (or accessory 520 which has a Size A tongue) with the tee 24, the housing pieces 34, 34' are initially separated. The Size A adaptor 220 having the Size A NEMA device (or accessory 520 which has a Size A tongue) mounted therein is then inserted into one of the housing pieces 34 such that the first wall section 226 engages with the surfaces which form one of the entrance opening 82, 86, 90, 94, and the second wall section 228 engages with the surfaces which form the associated tongue receiving passageway 84, 88, 92, 98. The body 222 extends outwardly from the first wall portion 66 of the tee 24. A tight friction fit is achieved between the tongue 224 and the tee 24. Any additional Size A adaptors 220 and attached Size A NEMA devices 420 (or accessories 520 which has a Size A tongue) which are desired to be attached to the tee 24 are also inserted at this time. Thereafter, the second housing piece 34' is mated with the first housing piece 34 and engages the Size A adaptor 220 in the same manner, and is affixed to the first housing piece 34. This clamps the Size A adaptor 220 between the housing pieces 34, 34'. If the skirts 128, 128' are provided, the skirts 128, 128' overlap the body 222 and hide the connection point between the Size A adaptor 220 and the tee 24.

In an embodiment, the portion of the surface 266c, 266c' of the base wall 266, 266' which is forward of the tongue receiving groove 265, 265' may have a plurality of teeth 276, 276' thereon. In this embodiment, when the wall sections 226, 226' engage with the teeth 276, 276', the teeth 276, 276' form individual points of contact with the wall sections 226, 226' to better engage the wall sections 226, 226'.

In an embodiment, the portion of the base wall 266, 266' which is forward of the tongue receiving groove 265, 265' may have surfaces which angle outwardly from each other to further enhance the frictional fit of the second wall section 428 with the adaptor piece 234, 234'. In some embodiments, crush ribs (not shown) may be provided on surfaces which are crushed when the NEMA device 420 or accessory 520 is engaged with the adaptor piece 234, 234'.

The width of the tongue receiving recesses 242, 242' and the height of the tongue receiving recesses of each adaptor piece 234, 234' defines a first size.

The Size B adaptor 320 is identically formed to the Size A adaptor 220, except for the differences noted herein; the same reference numerals are used herein to denote the components of the Size B adaptor 320 with the reference numerals being in the three hundreds instead of the two hundreds. The width of the tongue receiving recesses 242, 242' of the adaptor pieces 234, 234' of the Size A adaptor 220 is less than the width the of the tongue receiving recesses 342, 342' of the adaptor pieces 334, 334' of the Size B adaptor 320, and the height of the tongue receiving recesses 242, 242' of the adaptor pieces 234, 234' of the Size A adaptor 220 is less than the height the of the tongue receiving recesses 342, 342' of the adaptor pieces 334, 334' of the Size B adaptor 320. The width of the tongue receiving recesses 342, 342' and the height of the tongue receiving recesses of each adaptor piece 334, 334' defines a second size. As a result, the tongue receiving passageway 284 of the Size A adaptor 220 is smaller than the tongue receiving passageway 384 of the Size B adaptor 320. A Size B NEMA device 420 or an accessory 520 is seated within the Size B adaptor 320 in the same manner as described for the Size A adaptor 220, and the Size B adaptor 320 is attached to the tee 24 in the same manner as described for the Size A adaptor 220.

Figure 25:
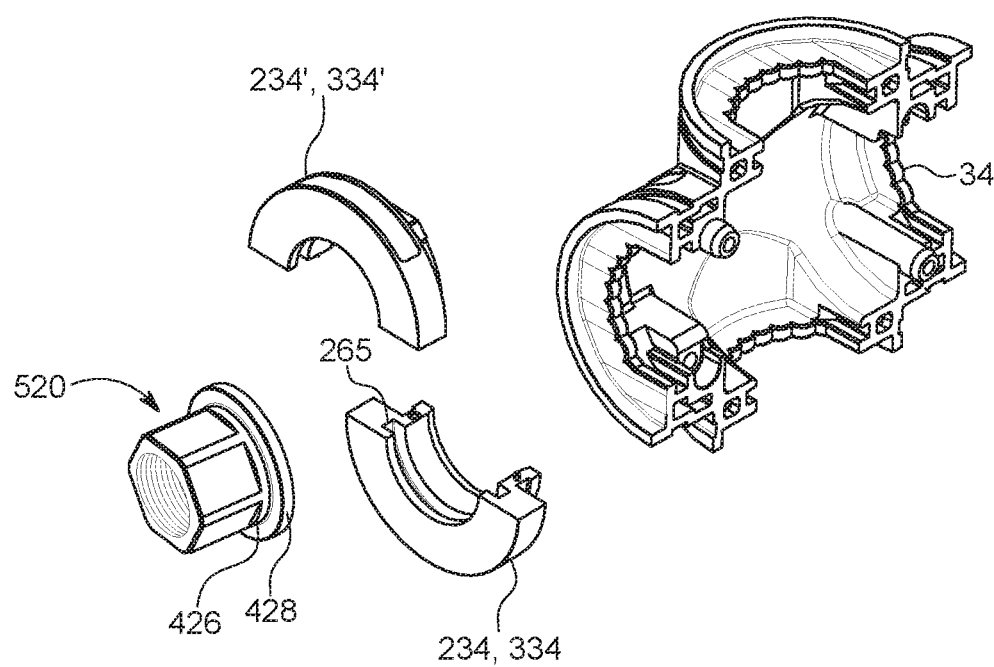
FIG. 25 is an exploded perspective view of a housing piece of the tee, a modified adaptor piece and an accessory.

In an embodiment, the tongue receiving grooves 265, 265' in the adaptor 220 or 320 are curved along its entire length as shown in FIG. 25. In this embodiment, the second wall section 428 of the accessory 520 (or NEMA device 420, if desired) has a circular outer profile. This allows the accessory 520 (or NEMA device 420 if such a circular second wall section 428 is provided) to rotate relative to the adaptor 220 or 320. The distance between opposite sides of the curved tongue receiving grooves 265, 265' partially defines the sizes.

In an embodiment, the side wall openings 50, 52, 54, 56 form a circular opening. The distance between opposite sides of the side wall openings 50, 52, 54, 56 partially defines the sizes.

In an embodiment, the tee 24 is a 4-way tee as illustrated in the drawings, and has four tongue receiving recesses 42, 44, 46, 48. In an embodiment, the side wall openings 50, 52, 54, 56 are provided 90 degrees apart from one another.

Examples of accessories 520 are shown in FIGS. 18-27.

Figure 18:
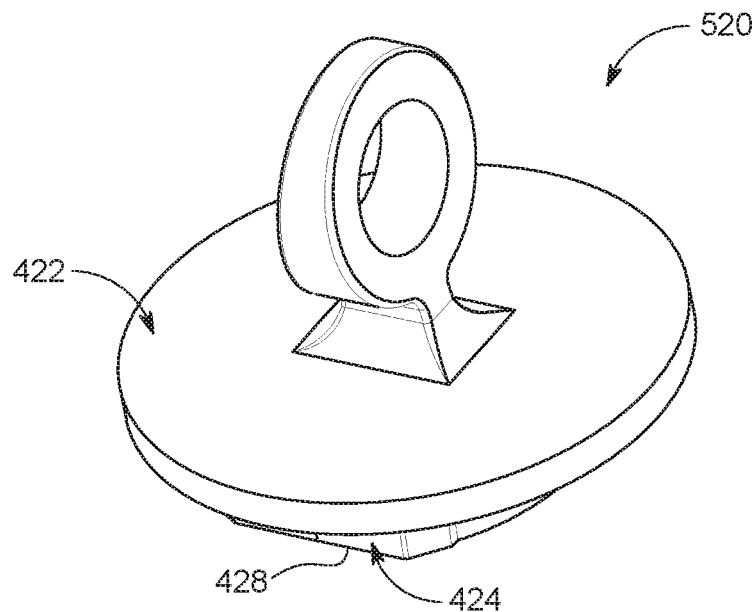
FIGS. 18-24 are perspective views of example accessories which can be attached to the modular power tee distribution assembly.

For example, an accessory 520 which takes the form of a hanger such as that shown in FIG. 18 can be received within entrance opening 82, 86, 90, 94.

Figure 19:
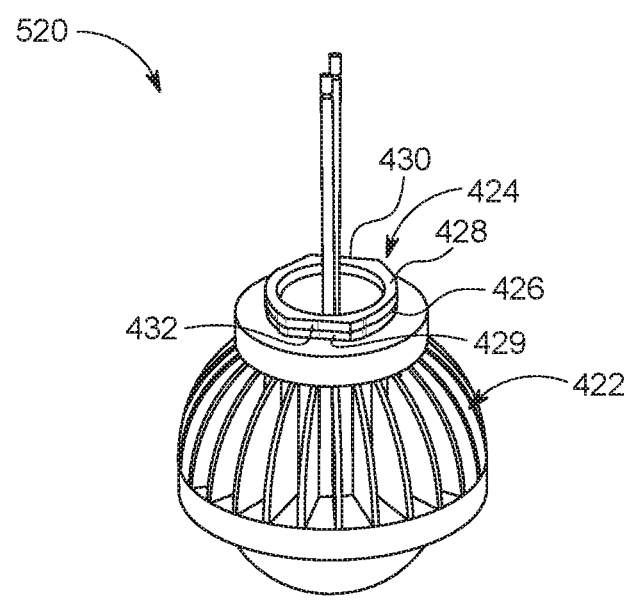
Figure 20:
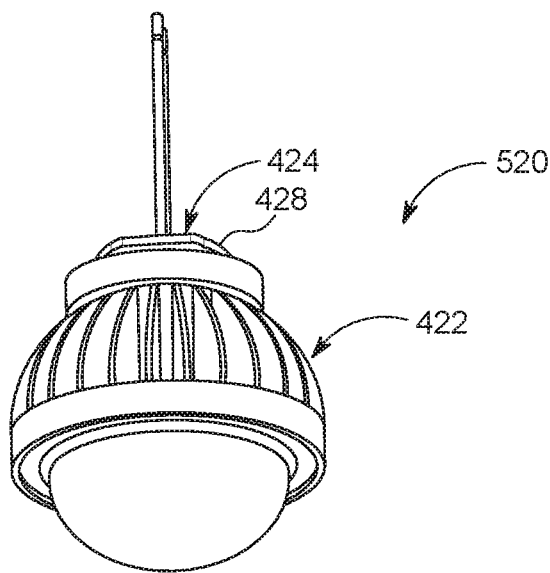

For example, an accessory 520 which takes the form of a light such as that shown in FIGS. 19 and 20 can be received within the entrance opening 82, 86, 90, 94. The light accessory 520 may have an LED light engine of the type illustrated, or may be any other light engine. The light engine is outfitted with a Size C tongue allowing the light accessory 520 to be both physically and electrically connected to the tee 24. The tee 24 allows for highly flexible lighting layouts that are easily configured on site.

Figure 21:
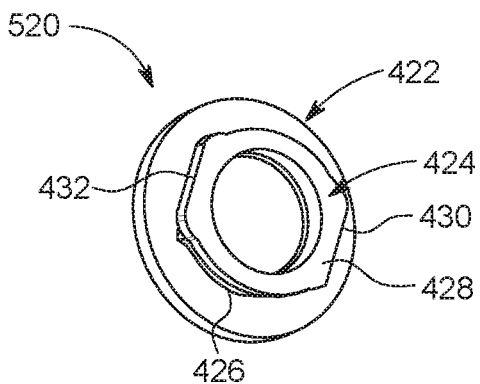
Figure 22:
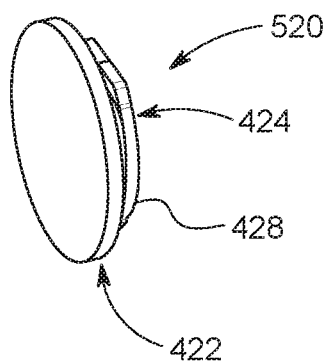

For example, an accessory 520 which takes the form of a terminating cap such as that shown in FIGS. 21 and 22 can be used to close off any one of the entrance opening 82, 86, 90, 94 if the opening is not desired to be utilized.

Figure 23:
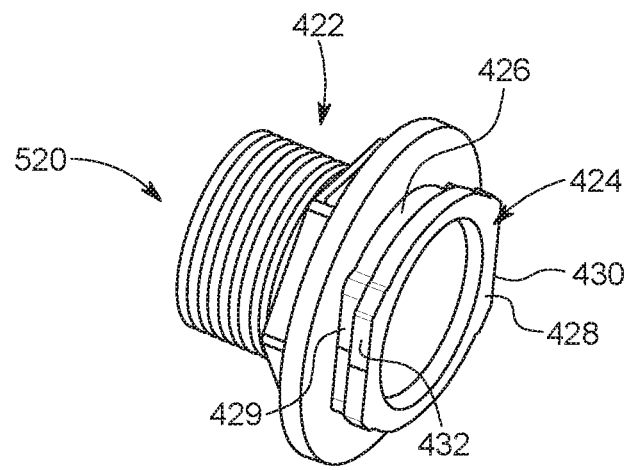
Figure 24:
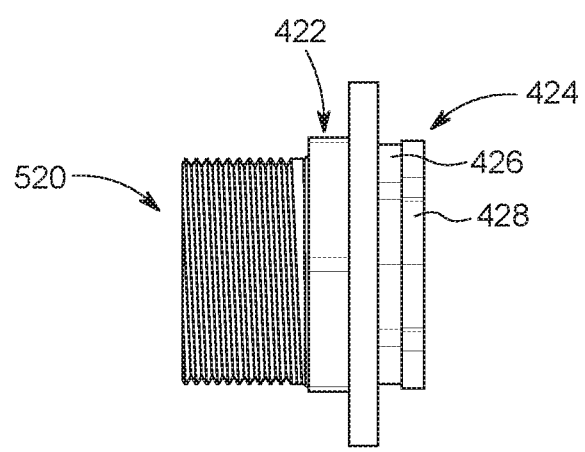

For example, an accessory 520 can take the form of a National Pipe Thread (NPT) thread (external) such as that illustrated in FIGS. 23 and 24.

For example, an accessory 520 can take the form of a National Pipe Thread (NPT) thread (internal), such as ¾ inch NPT or ½ inch NPT such as that illustrated in FIG. 25.

For example, an accessor 520 can take the form of a hangar.

Figure 26:
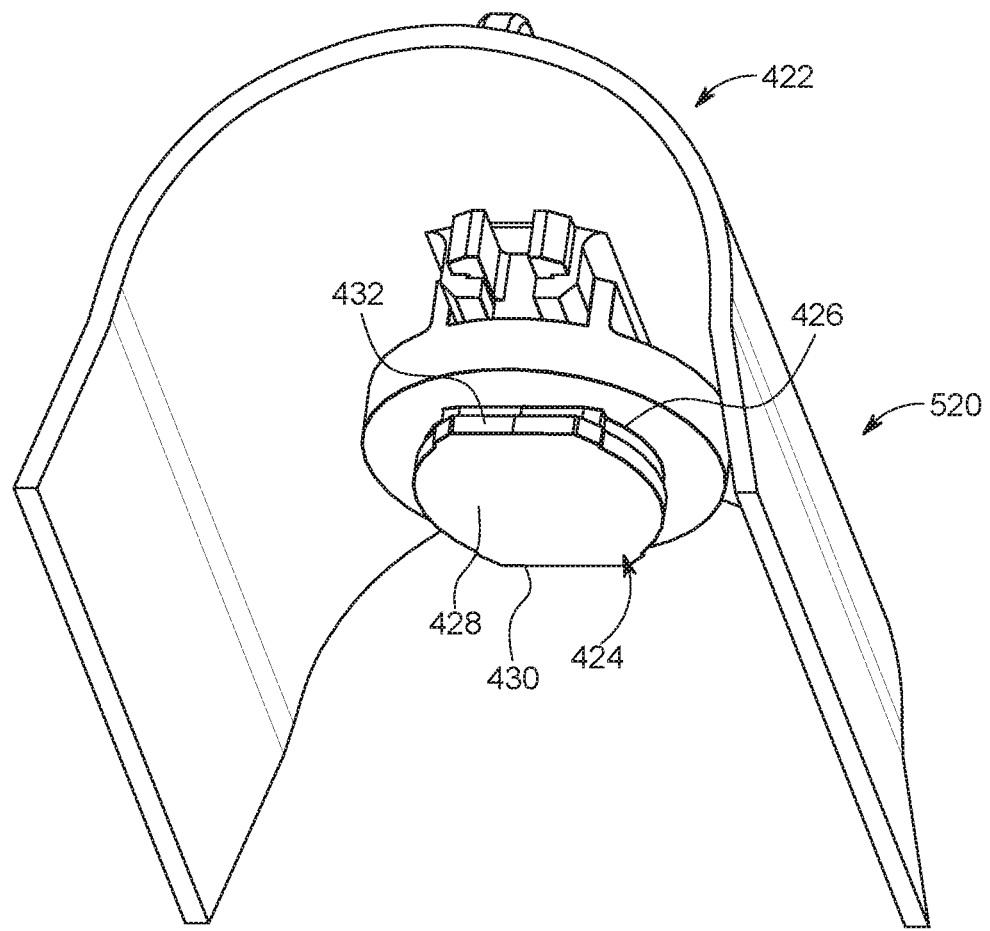
FIGS. 26 and 27 are perspective views of example accessories which can be attached to the modular power tee distribution assembly.
Figure 27:
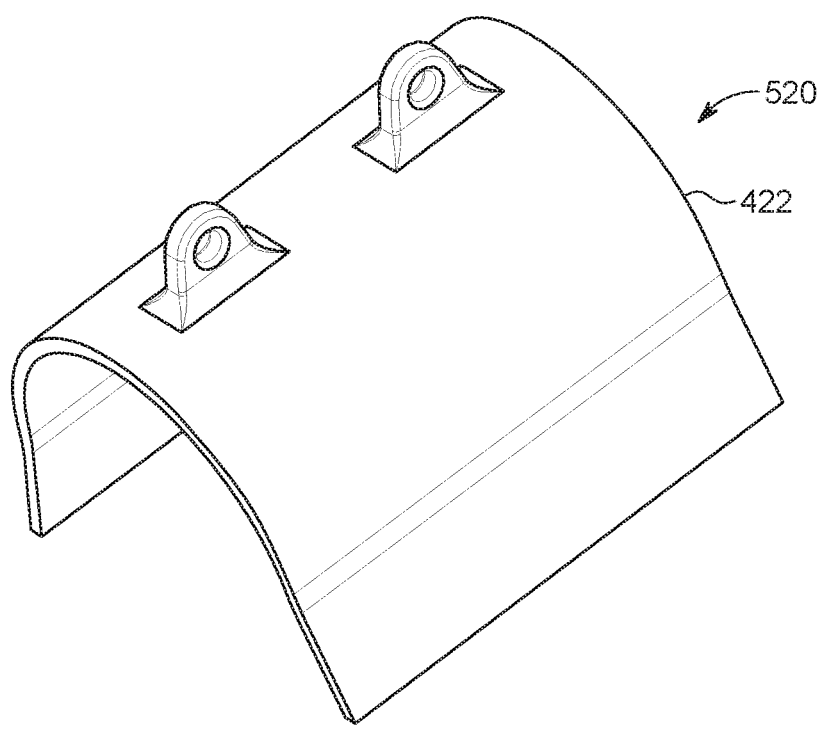
Figure 28:
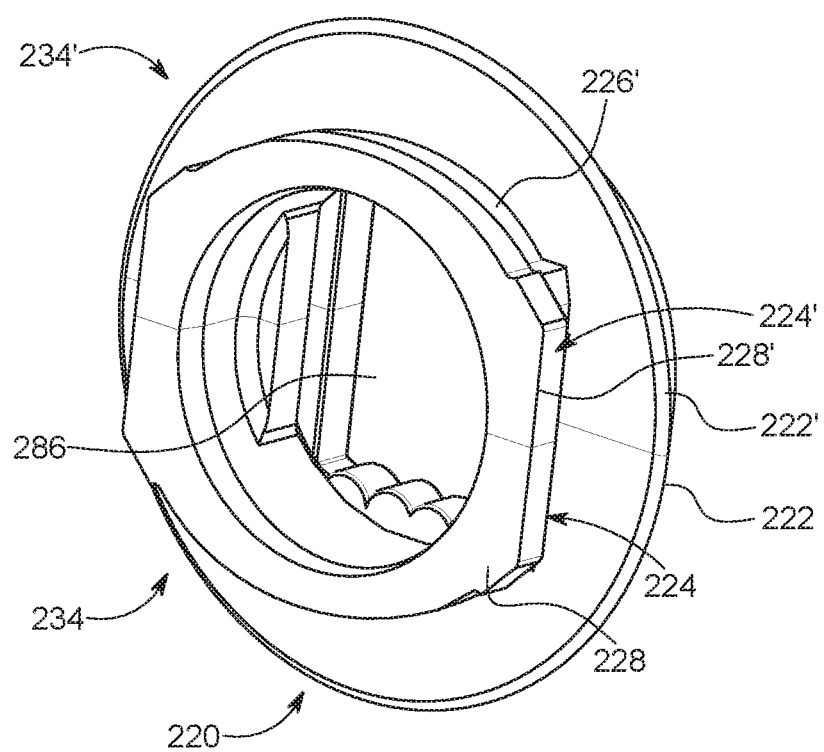
FIG. 28 is a rear perspective view of an adaptor which forms part of the modular power tee distribution assembly.
Figure 29:
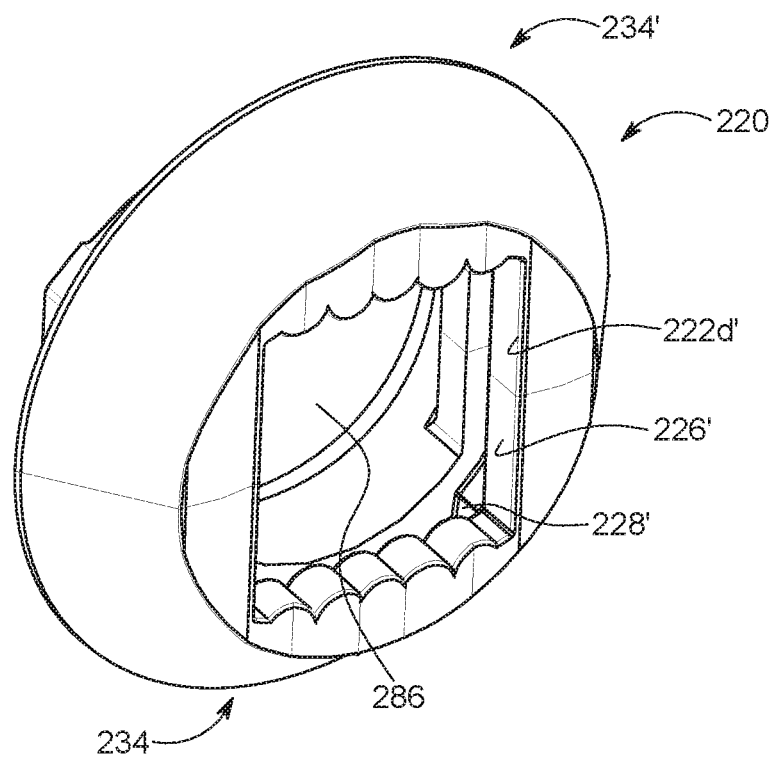
FIG. 29 is a front perspective view of the adaptor of FIG. 28.
Figure 30:
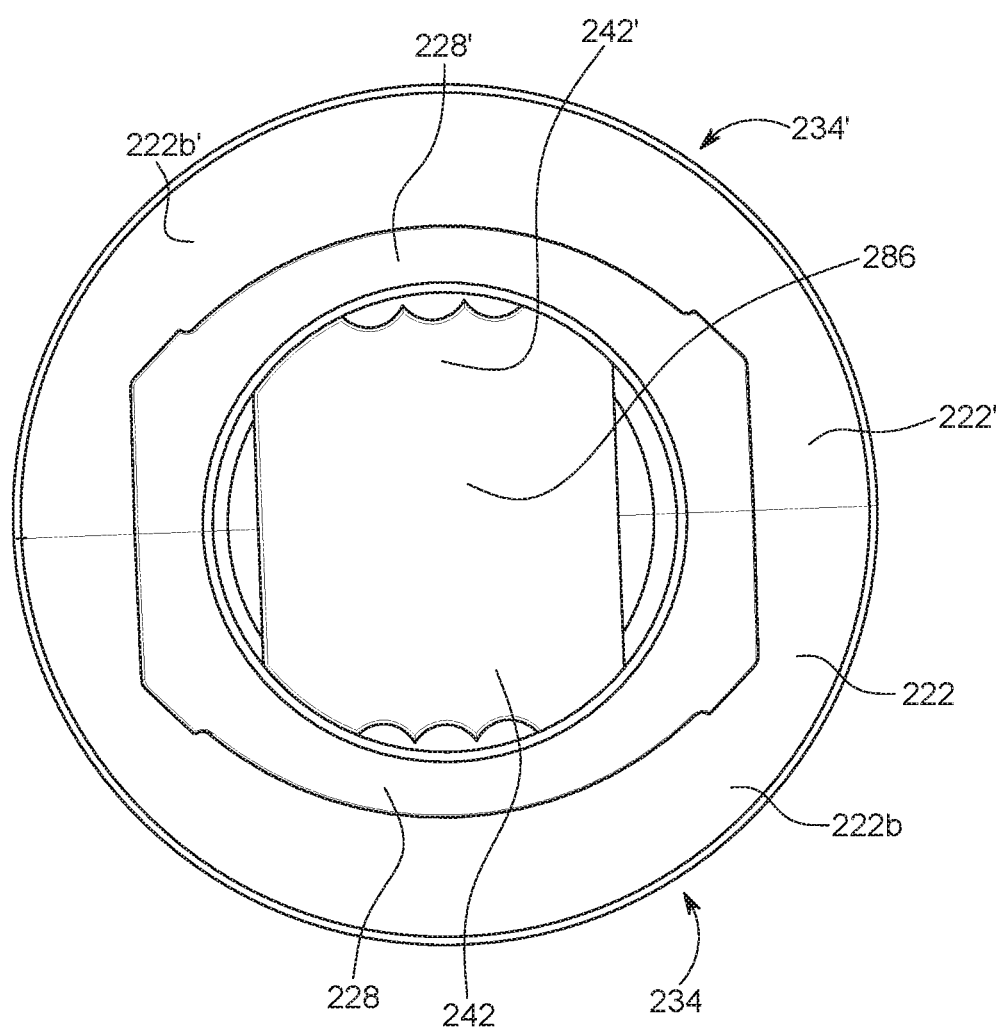
FIG. 30 is a rear elevation view of the adaptor of FIG. 28.
Figure 31:
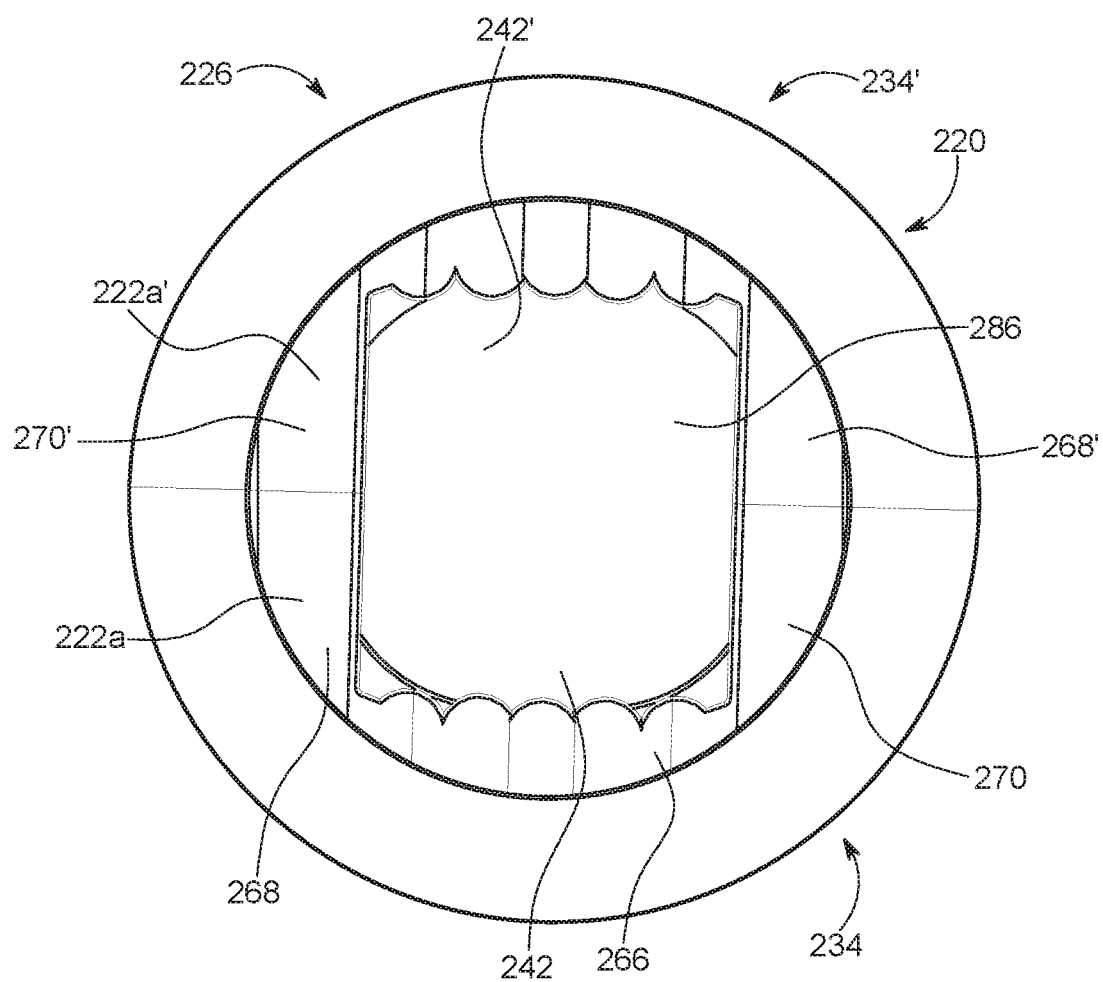
FIG. 31 is a front elevation view of the adaptor of FIG. 28.
Figure 32:
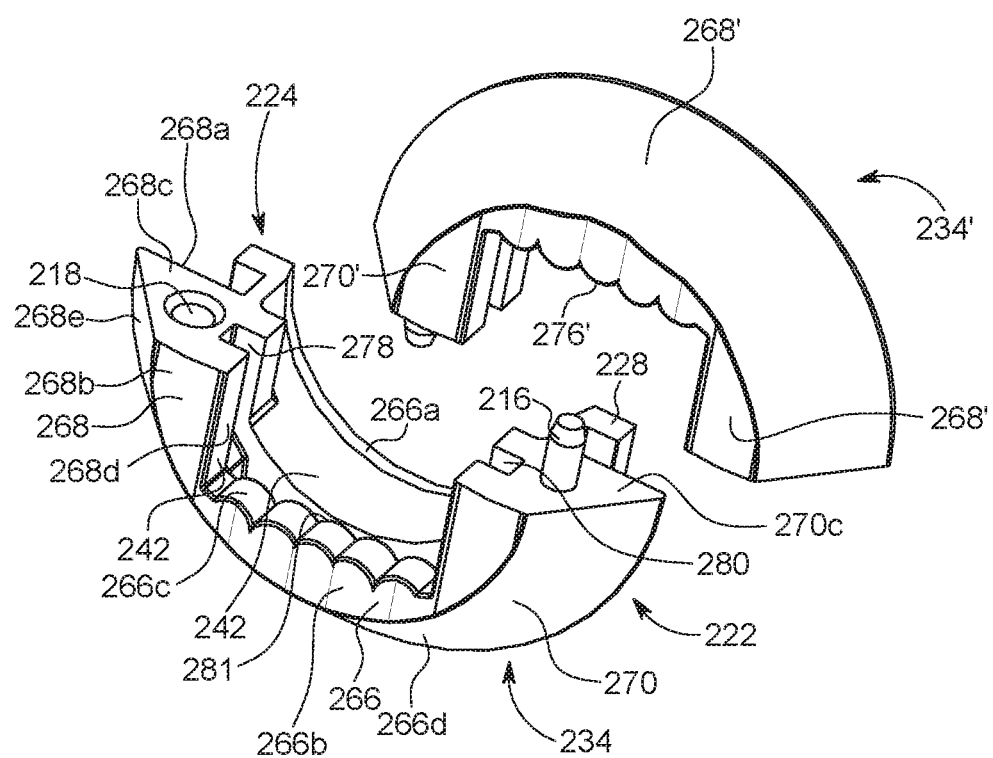
FIG. 32 is an exploded, front perspective view of the adaptor of FIG. 28.
Figure 33:
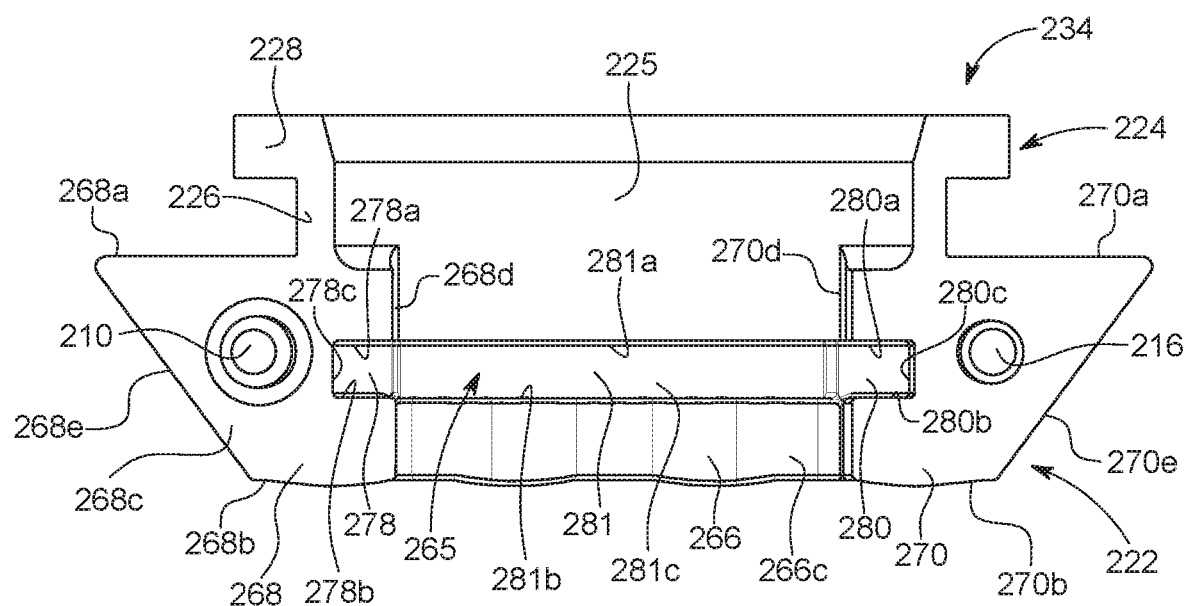
FIG. 33 is a top plan, perspective view of the adaptor of FIG. 28.

For example, an accessory 520 can take the form of an environmental accessory 520, namely a shroud accessory, such as that illustrated in FIGS. 26 and 27. The shroud accessory 520 has a Size C tongue on one side and a shroud clip on the opposite side. The shroud clip allows for a shroud to be connected thereto which shroud can be configured in order to protect the tee 24 from various conditions in the environment, such as rain, snow, ice and incidental splash.

For example, an accessory 520 can take the form of a mechanical system "tongue-to-tongue" accessory. The accessory 520 with Size C size tongue design to a Size C size tongue design, referred to as a Size C to Size C accessory, is used to connect two tees 24 together. One of the Size C tongues of the Size C to Size C accessory is received by a first tee, and the other Size C tongue of the same accessory is received by a second tee. In the same way, a second Size C to Size C accessory can be used to connect a third tee, and a third Size C to Size C accessory can be used to connect a fourth tee. Similarly, by using multitudes of Size C to Size C accessories, many tees can be connected together.

Further examples of accessories 520 include, but are not limited to, an eye loop, a j-hook, an s-hook, or a swivel mount that can be used to aid in mounting/hanging/suspending/etc. the modular power tee distribution assembly 20.

The adaptor 220 or 320, as illustrated in FIG. 25, provides for coupling the adaptor 220 or 320 directly to the tee 24 and provides a tongue receiving groove 265 (which may be curved along its entire length or may include flat surfaces) into which a Size C tongue seats, or into which a Size B tongue seats, or into which a Size A tongue seats, and are referred to herein as "tongue-to-tongue" adaptors. The tongue-to-tongue adaptors have the Size C size tongue to be received by any of the tongue receiving recesses 42, 44, 46, 48, and either a Size A tongue or a Size B tongue to be received.

Figure 34:
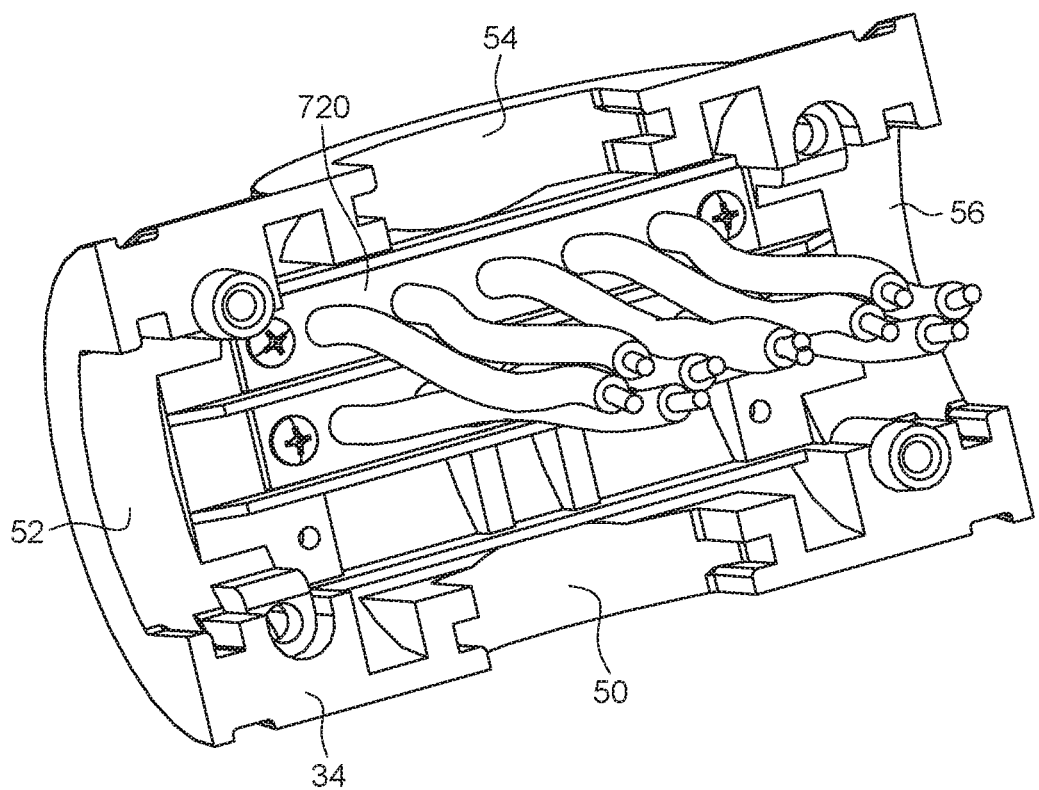
FIG. 34 is a perspective view of an adaptor piece having a bus bar attached thereto.

As illustrated in FIG. 34, the tee 24 may also utilize pre-assembled bus-bar wiring system 720 which is attached to one of the housing pieces 34 in the pocket 40. Thus, as compared to current power distribution systems, the modular power tee distribution assembly 20 will greatly reduce wiring time, reduce wiring space, and reduce wiring errors.

In an embodiment, a cable tie 133 is seated within one or more of the grooves 132. The cable tie 133 can be colored to represent electrical properties of the NEMA device 420 or accessory 520 which extends from the tee 24 proximate to the cable tie 133.

In an embodiment, an adaptor having a Size B tongue receiving passageway 384 can have an appropriately sized adaptor seated therein which has a Size C entrance passageway 86 such that multiple adaptors are stacked onto each other.

Thus, the modular power tee distribution assembly 20 as described and illustrated provides a number of advantages over the current power distribution systems that are utilized in temporary building structures, data-centers, manufacturing plants, and any other facilities/locations where portable devices are used.

The use of the terms "a" and "an" and "the" and "at least one" and similar references in the context of describing the disclosure (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All processes described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A modular power tee distribution assembly comprising:
   a tee including a first housing piece and a second housing piece,
   the first housing piece comprising a wall defining a pocket, the wall having a plurality of wall openings therethrough which are in communication with the pocket, each wall opening having a tongue receiving recess associated therewith,
   the second housing piece comprising a wall defining a pocket, the wall of the second housing piece having a plurality of wall openings therethrough which are in communication with the pocket of the second housing piece, each wall opening of the second housing piece having a tongue receiving recess associated therewith,
   wherein the first and second housing pieces are configured to be mated together, wherein when mated together, the pockets form a cavity, the wall openings form entrance openings into the cavity, and the tongue receiving recesses in the first housing piece align with respective tongue receiving recesses in the second housing piece and form tongue receiving passageways;
   first, second, third and fourth adaptor pieces configured to be mounted to the housing pieces, each adaptor piece having a body and a tongue extending therefrom, a recess extending from a front end of the adaptor piece to a rear end of the adaptor piece, and further including a tongue receiving groove in the body, the tongue receiving groove being in communication with the recess of the adaptor piece, wherein the tongue of each adaptor piece is configured to be received in the tongue receiving recesses of the housing pieces;
   wherein the recess and tongue receiving groove of each of the first and second adaptor pieces has a first size and the recess and tongue receiving groove of each of the third and fourth adaptor pieces has a second size, the first size and the second size being different.

2. The modular power tee distribution assembly of claim 1, wherein the tongue receiving passageways of the first and second adaptor pieces are smaller than the tongue receiving passageways of the third and fourth adaptor pieces.

3. The modular power tee distribution assembly of claim 1,
   wherein the tongue receiving passageways of the first and second adaptor pieces have a width and the wall openings of the first and second adaptor pieces have a height, the width and height defining the first size, and
   wherein the tongue receiving passageways of the third and fourth adaptor pieces have a width and the wall openings of the third and fourth adaptor pieces have a height, the width and height of the third and fourth adaptor pieces defining the second size,
   wherein the second size is smaller than the first size.

4. The modular power tee distribution assembly of claim 1, wherein the first and second adaptors are identically formed, and the third and fourth adaptors are identically formed.

5. The modular power tee distribution assembly of claim 1, wherein the first and second housing pieces are identically formed.

6. The modular power tee distribution assembly of claim 1, wherein the first and second housing pieces are mated together by fasteners.

7. The modular power tee distribution assembly of claim 1, wherein in the wall openings in each housing piece have a wall surface which is curved.

8. The modular power tee distribution assembly of claim 7, wherein each wall surface has a plurality of teeth thereon.

9. The modular power tee distribution assembly of claim 1, in combination with a NEMA device having a tongue which can be received in one of the tongue receiving recesses of the housing pieces and the tongue receiving grooves of the adaptor pieces.

10. The modular power tee distribution assembly of claim 1, in combination with a NEMA device having a tongue which can be received in the tongue receiving grooves of the first and second adaptor pieces.

11. The combination of claim 10, further comprising a second NEMA device, the second NEMA device having a tongue which can be received in the tongue receiving grooves of the third and fourth adaptor pieces.

12. The combination of claim 11, further comprising a third NEMA device, the third NEMA device having a tongue which can be received in one of the tongue receiving recesses of the housing pieces and the tongue receiving grooves of the adaptor pieces.

13. The modular power tee distribution assembly of claim 1, in combination with an accessory having a tongue which can be received in the tongue receiving recesses of the housing pieces.

14. The modular power tee distribution assembly of claim 1, in combination with an accessory having a tongue which can be received in the tongue receiving grooves of the first and second adaptor pieces.

15. The combination of claim 14, further comprising a second accessory, the second accessory having a tongue which can be received in the tongue receiving grooves of the third and fourth adaptor pieces.

16. The combination of claim 15, further comprising a third accessory, the third accessory having a tongue which can be received in the tongue receiving recesses of the housing pieces.

17. The combination of claim 14, wherein the accessory is one of a hanger, a light, a terminating cap, an externally threaded member, an internally threaded member, and a shroud.

18. The combination of claim 14, wherein the accessory provides first and second tongues, the first tongue configured to be attached to the tee.

19. The combination of claim 14, wherein the accessory provides a first tongue and a tongue receiving groove, the first tongue configured to be attached to the tee, the tongue receiving groove of the accessory configured to receive a third member.

20. The modular power tee distribution assembly of claim 1, further comprising a bus bar mounted in at least one of the housing pieces.

21. The modular power tee distribution assembly of claim 1, further in combination with a second modular power tee distribution assembly.

22. A tee configured to be used in a modular power tee distribution assembly comprising:
    opposite base walls;
    a side wall extending between the base walls;
    the side wall having a plurality of spaced apart openings provided therethrough; and
    a tongue receiving passageway proximate to each opening, wherein each tongue receiving passageway is configured to receive a component, the component being capable of being received in each tongue receiving passageway, wherein each opening has planar surfaces which face each other, and wherein each planar surface has a plurality of teeth thereon.

23. The tee of claim 22, wherein each tongue receiving passageway comprises first and second grooves which face each other, and a space between the grooves.

24. The tee of claim 23, wherein each groove has a flat surface, the flat surfaces facing each other.

25. The tee of claim 22, wherein each opening has curved surfaces extending between the planar surfaces.

26. A modular power tee distribution assembly comprising:
    a tee having opposite base walls, a side wall extending between the base walls, the side wall having a plurality of spaced apart openings provided therethrough, and a tongue receiving passageway proximate to each opening;
    a first adaptor configured to be mounted to the tee, the first adaptor having a body, a tongue extending from the body, an opening at a front end of the body, a passageway extending from the opening of the first adaptor to a rear end of the first adaptor, and a tongue receiving groove in the body, the tongue receiving groove of the body being in communication with the passageway of the first adaptor, wherein the tongue of the first adaptor is configured to be received in the tongue receiving passageway of the tee; and
    a second adaptor configured to be mounted to the tee, the second adaptor having a body, a tongue extending from the body of the second adaptor, an opening at a front end of the body of the second adaptor, a passageway extending from the opening of the second adaptor to a rear end of the second adaptor, and a tongue receiving groove in the body of the second adaptor, the tongue receiving groove of the second adaptor being in communication with the passageway of the second adaptor, wherein the tongue of the second adaptor is configured to be received in the tongue receiving passageway of the tee;
    wherein the opening, passageway and tongue receiving groove of the first adaptor has a first size, and the opening, passageway and tongue receiving groove of the second adaptor piece has a second size, the first size and the second size being different.

27. The modular power tee distribution assembly of claim 26, wherein the opening, passageway and tongue receiving groove of the first adaptor are smaller than the opening, passageway and tongue receiving groove of the second adaptor piece.

28. The modular power tee distribution assembly of claim 26,
    wherein the passageway and tongue receiving groove of the first adaptor defines a width and the opening of the first adaptor defines a height, the width and height defining the first size, and
    wherein the passageway and tongue receiving groove of the second adaptor defines a width and the opening of the second adaptor defines a height, the width and height of the second adaptor defining the first size, and
    wherein the second size is smaller than the first size.

* * * * *